United States Patent
Reagan et al.

[11] Patent Number: 5,963,918
[45] Date of Patent: Oct. 5, 1999

[54] SYSTEM AND METHOD OF OPTIMIZING ROLLING MILL ROLL INVENTORY

[75] Inventors: Daniel L. Reagan, Leominster; S. Mark Shore, Dudley, both of Mass.

[73] Assignee: Morgan Construction Company, Worcester, Mass.

[21] Appl. No.: 08/739,269

[22] Filed: Oct. 29, 1996

[51] Int. Cl.[6] ............................. G06F 15/46; G06F 15/24; B65G 1/10
[52] U.S. Cl. ................................ 705/28; 705/22; 705/7
[58] Field of Search .................................. 705/28, 7, 22; 364/472.01, 472.03, 472.04, 472.06

[56] References Cited

U.S. PATENT DOCUMENTS

| | | | |
|---|---|---|---|
| 4,745,556 | 5/1988 | Turley | 364/472 |
| 4,783,740 | 11/1988 | Ishizawa et al. | 364/403 |
| 4,796,209 | 1/1989 | Burk | 364/559 |
| 4,840,051 | 6/1989 | Boratto et al. | 72/11 |
| 4,972,318 | 11/1990 | Brown et al. | 364/403 |
| 5,101,352 | 3/1992 | Rembert | 364/401 |
| 5,128,861 | 7/1992 | Kagami et al. | 364/403 |
| 5,307,261 | 4/1994 | Maki et al. | 364/401 |
| 5,319,544 | 6/1994 | Schmerer et al. | 364/403 |
| 5,334,822 | 8/1994 | Sanford | 235/385 |

*Primary Examiner*—Allen R. MacDonald
*Assistant Examiner*—Pedro R. Kanof
*Attorney, Agent, or Firm*—Samuels, Gauthier & Stevens

[57] ABSTRACT

A system and method for optimizing an inventory of rolls used in a rolling mill, the rolling mill having a plurality of rolling equipment each utilizing a predetermined combination of roll stands and roll guides. Each of the roll stands and roll guides utilizes at least one pair of rolls for respectively working and guiding an entry product of a predetermined size into an output product of a selected size. The method and system operates to compile and store data corresponding to individual rolls in the inventory. Operational parameters are defined for the rolling mill to produce the output product. The data corresponding to the individual rolls is iteratively correlated with the operational parameters to create an array of possible roll combinations for each roll stand or roll guide. Optimal family sets of rolls are determined from the array of possible roll combinations for the rolling mill in accordance with the operational parameters.

18 Claims, 23 Drawing Sheets

FIG. 4

MORGAN Inventory Management System (MIMS) – ROLLINV.MDB

Save  Exit

33 Configurations: NTM-5;RSM-28

| Config Name | 11.25 | 12.0 | 12.25 | 12.75 | 13.0 | 22.0 | 5.0 | 5.5 |
|---|---|---|---|---|---|---|---|---|

Edit—Reducing/Sizing Mill Configuration 12.0

| Entry Size | Delivery Size | Total Deviation |
|---|---|---|
| 16.25 | 12.16 | 2.00 |

| Stand | Groove Name | Groove Shape | Roll Parting | Roll Deviation | Roll Comp. | Roll Life |
|---|---|---|---|---|---|---|
| 11 | K16 | OV | 1.40 | 0.50 | 0.00 | 300 |
| 12 | Get Groove | | 0 | 0.50 | 0.00 | 300 |
| 13 | Dummy Groove | | 0 | 0.50 | 0.00 | 300 |
| 14 | 12.0 | FR | 1.40 | | | 300 |

Configs...ConfigDetails     Mill Architect     11:33:41 AM

FIG. 5

MORGAN Inventory Management System (MIMS) – ROLLINV.MDB

Sort  Find  Exit                                    Help

| Number | Suffix | Roll Type |
|---|---|---|
| 3256 | i | NTM, 1 Groove |
| 357951 | a | *Edit* – 1 Groove |
| 357951 | b | Stats – 1 Groove |
| 357951 | c | View – 1 Groove |
| 10013897 | d | New / Delete Groove |
| 10013898 | | LH PR, 4 Groove |
| 10081070 | | SM 6inch, 1 Groove |
| 10086594 | | NTM PR, 1 Groove |
| 10090130 | | NTM 8inch, 2 Groove |

Drawings     Mill Architect     11:19:20 AM

| Roll Index | Drawing Number | Roll Diameter | Storage Position | Roll Quality | Current Location | Family Name |
|---|---|---|---|---|---|---|
| SM-102 | 10086594 | 197.69 | 1 | SM-1 | I.S. | Free Roll |
| SM-103 | 10086594 | 195.32 | | SM-1 | I.S. | Free Roll |
| SM-105 | 10086594 | 202.87 | New | SM-1 | I.S. | Free Roll |
| SM-106 | 10205790 | 201.96 | Delete | SM-1 | I.S. | Free Roll |
| SM-107 | 10205790 | 210.90 | Grind | SM-1 | I.S. | Free Roll |
| SM-108 | 10205790 | 189.54 | View | SM-1 | I.S. | Free Roll |
| SM-109 | 10205790 | 194.59 | Move | SM-1 | I.S. | Free Roll |
| SM-110 | 10205790 | 191.92 | 1 | SM-1 | I.S. | Free Roll |

MORGAN Inventory Management System [MIMS]–ROLLINV. MDB

873 Rolls Displayed

View  Sort  Find  Exit                                                    Help

Rolls                    Mill Architect                    3:10:33 PM

SM-213 (NTM 6 inch, 2 Groove)

Exit

| Location | In Storage | Roll Dia. | 156.50 |
| --- | --- | --- | --- |
| Drawing | 15543000-W | Quality | SM-1 |
| Family | Free Roll | Storage | 1 |

| Groove | Groove Name | Groove Shape | Groove Condition | Tons Rolled | Percent Life |
| --- | --- | --- | --- | --- | --- |
| 1 | NTM-6.5 | FR | Clean | 0 | 0.00% |
| 2 | NTM-6.5 | FR | Clean | 0 | 0.00% |

FIG. 13

Move Roll SM-108

String

Integer
1

Move
Reset
Cancel

Move Family NTM E-0

String

Integer
1

Move
Reset
Cancel

FIG. 28

| STAND 1 GROOVE-A3 | | |
|---|---|---|
| ORDER | ROLL ID | ROLL DIAMETER (mm) |
| 1 | 0001 | 220.34 |
| 2 | 0012 | 220.32 |
| 3 | 0134 | 220.36 |
| 4 | 0056 | 219.23 |

FIG. 32

| | ROLL ARRAY INDICES | | | | | | | | | | |
|---|---|---|---|---|---|---|---|---|---|---|---|
| FAMILY INDEX | Std 1 | Std 2 | Std 3 | Std 4 | Std 5 | Std 6 | Std 7 | Std 8 | Std 9 | Std 10 | Stds> Limits |
| 1 | 7 | 8 | 8 | 5 | 7 | 7 | 7 | 4 | 6 | 6 | 2 |
| 2 | | | | | | | | | | | |
| 3 | | | | | | | | | | | |

FIG. 33

| | INTERSTAND ROLL DEVIATION | | | | | | | | | TOTAL |
|---|---|---|---|---|---|---|---|---|---|---|
| FAMILY INDEX | Std 1-2 | Std 2-3 | Std 3-4 | Std 4-5 | Std 5-6 | Std 6-7 | Std 7-8 | Std 8-9 | Std 9-10 | DEV. |
| 1 | | | | | | | | | | |
| 2 | | | | | | | | | | |
| 3 | | | | | | | | | | |

FIG. 29

| STAND 1 GROOVE-A3 | | | |
|---|---|---|---|
| INDEX | ROLL 1 | ROLL 2 | MEAN ROLL DIA. (mm) | ROLL DEV. (mm) |
| 1 | 0001 | 0134 | 220.35 | 0.02 |
| 2 | 0012 | 0134 | 220.34 | 0.04 |
| 3 | 0001 | 0012 | 220.33 | 0.02 |
| 4 | 0056 | 0134 | 219.79 | 1.13 |
| 5 | 0001 | 0056 | 217.78 | 1.11 |
| 6 | 0012 | 0134 | 219.77 | 1.09 |

FIG. 30

| STAND NO. | MEAN ROLL DIAMETER (mm) PER ROLL INDEX | | | | | | | | | |
|---|---|---|---|---|---|---|---|---|---|---|
| | 1 | 2 | 3 | 4 | 5 | 6 | 7 | 8 | 9 | 10 |
| 1 | 220.35 | 220.34 | 220.33 | 219.56 | 215.68 | 211.25 | 210.98 | | | |
| 2 | 226.35 | 225.15 | 220.05 | 217.71 | 216.88 | 213.42 | 210.37 | 206.25 | 206.1 | |
| 3 | 228.34 | 228.02 | 226.95 | 225.12 | 222.36 | 221.47 | 220.21 | 209.61 | 208.22 | 206.28 |
| 4 | 228.08 | 227.66 | 225.18 | 222.36 | 220.21 | | | | | |
| 5 | 224.25 | 223.18 | 221.39 | 219.83 | 219.36 | 216.24 | 212.86 | 211.55 | 208.57 | 207.99 |
| 6 | 226.54 | 225.37 | 223.45 | 221.67 | 219.55 | 218.37 | 214.56 | 211.54 | 209.23 | |
| 7 | 228.34 | 227.69 | 225.24 | 222.24 | 220.87 | 217.22 | 213.27 | 210.67 | 209.52 | 208.37 |
| 8 | 170.66 | 170.53 | 169.25 | 166.32 | 164.37 | 164.01 | 162.89 | | | |
| 9 | 170.00 | 169.50 | 169.23 | 167.30 | 166.25 | 165.47 | 163.54 | 160.35 | 158.3 | |
| 10 | 170.66 | 170.53 | 170.25 | 168.20 | 167.65 | 166.24 | | | | | ns

SYSTEM AND METHOD OF OPTIMIZING ROLLING MILL ROLL INVENTORY

BACKGROUND OF THE INVENTION

The invention relates to a system and method of optimizing a rolling mill roll inventory.

The use of computer based automated inventory and retrieval systems has become a necessity for many large-volume processes in which a large number of items must be stored for a period of time. Such processes include assembly line operations wherein a large number of identical items are temporarily stored prior to subsequent non-identical processing as well as retrieval systems where a large number of unique items must be stored in a manner such that quick retrieval is allowed.

The monitoring and verification of inventory is a necessity in a wide variety of industries. For example, in the steel rolling mill industry it is critical that accurate inventories are kept with regard to the rolls used in equipment in the mills. The rolls are configured to be used and reused for various rolling jobs. The rolls develop a history of use and age, and are ground to have desired surface characteristics such as grooves, etc. When a groove is worn to the point of being unusable with respect to one rolling job, it may still have a viable life for other jobs. This efficient use of rolls is essential in light of the ever rising costs of the rolls themselves.

In addition to the inventory issues, operators of rolling mills are very concerned with optimizing the inventory of rolls that they have on hand. Typically rolls are chosen in sets or families to produce the desired product. To date, mill operators typically make best guess estimates regarding the best set of rolls to use for a desired product. This may result in costly and unnecessary grinding of rolls to fit the particular job. Furthermore, it may be unclear as to when a roll should be discarded and no longer used in rolling operations.

SUMMARY OF THE INVENTION

Accordingly, it is an object of the present invention to manage information on rod and bar mill rolls, including purchasing data, history of roll use, dressing of rolls and roll storage locations.

It is a further object of the present invention to provide a system and method for configuring individual rolls into families or rolling lines, to produce a given size or range of sizes in the rolling mill. The creation and management of rolling line families is a critical function of such a system.

It is still a further object of the present invention to provide a method an system of optimizing a roll inventory to create groups of available stored rolls into usable rolling sets, then track their use an grinding history through the roll shop associated with the rolling mill.

In accordance with the present invention, there is provided a system and method for optimizing an inventory of rolls used in a rolling mill, the rolling mill having a plurality of rolling equipment each utilizing a predetermined combination of roll stands and roll guides. Each of the roll stands and roll guides utilizes at least one pair of rolls for respectively working and guiding an entry product of a predetermined size into an output product of a selected size. The method and system operates to compile and store data corresponding to individual rolls in the inventory. Operational parameters are defined for the rolling mill to produce the output product. The data corresponding to the individual rolls is iteratively correlated with the operational parameters to create an array of possible roll combinations for each roll stand or roll guide. Optimal family sets of rolls are determined from the array of possible roll combinations for the rolling mill in accordance with the operational parameters.

BRIEF DESCRIPTION OF THE DRAWINGS

FIG. 4 shows a configuration specifics interface in accordance with the present invention;

FIG. 5 shows a drawing interface menu in accordance with the present invention;

FIG. 9 shows a roll interface menu in accordance with the present invention;

FIG. 10 shows a roll create interface menu in accordance with the present invention;

FIG. 11 shows a grind roll interface menu in accordance with the present invention;

FIG. 12 shows a roll view interface menu in accordance with the present invention;

FIG. 13 shows a move roll/family interface menu in accordance with the present invention;

FIG. 28 shows an exemplary table of rolls sorted by the system of the present invention ordered in decreasing roll diameter;

FIG. 29 shows an exemplary table of an array of roll combinations as derived by the system of the present invention ordered and indexed based on decreasing mean roll diameter;

FIG. 30 shows an exemplary table of an array containing the mean roll diameters from the array of rolls for each stand derived by the system of the present invention;

FIG. 32 shows an exemplary table derived by the system of the present invention of the indices of the rolls that would fall within the limits for each stand into a families array; and FIG. 33 shows an exemplary table derived by the system of the present invention of the interstand roll deviations calculated between each stand, along with the actual total deviation from the first stand to the last stand.

DETAILED DESCRIPTION OF THE ILLUSTRATED EMBODIMENTS

Figure 1:
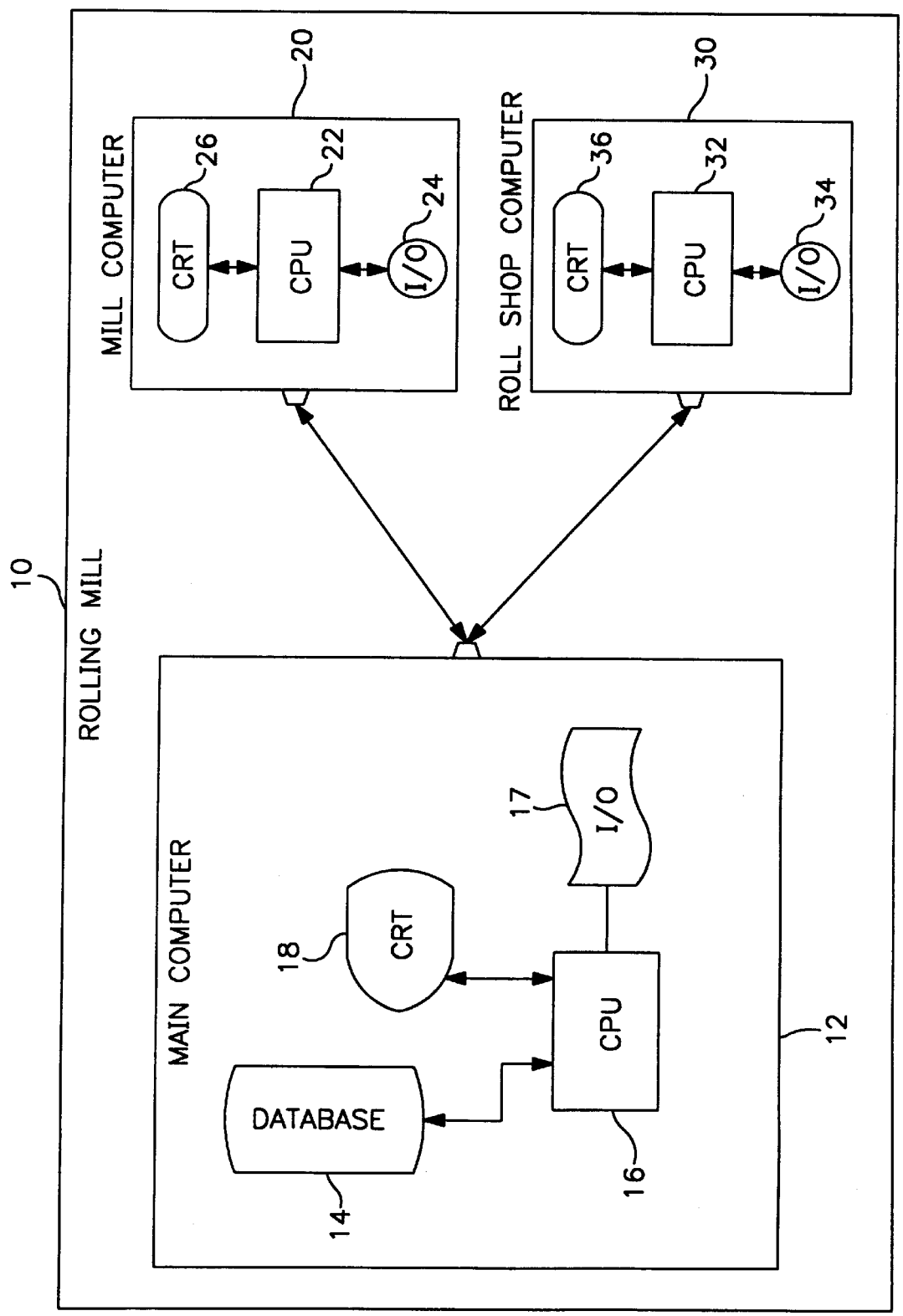
FIG. 1 shows a schematic block diagram of an exemplary embodiment of the present invention involving a software program which operates in conjunction with a computer system within a rolling mill.

The system and method of optimizing rolling mill roll inventories in accordance with the present invention operates to simplify the tracking, grinding and utilization of rolling mill rolls through the roll shop. An exemplary embodiment of the present invention involves a software program which operates in conjunction with a system 10 within a rolling mill utilizing a main conventional computer 12 and associated database 14 as shown in FIG. 1. The main computer has a CPU 16, an I/O device 17 and a display CRT 18. The system may also include a mill computer 20 which is situated within the rolling mill in the vicinity of the rolling equipment, and a roll shop computer 30 which is situated within the shop that serves as the area for storing and grinding of the rolls. The mill and roll shop computers have respective CPUs 22,32, I/O devices 24,34, and CRT displays 26,36. It will be appreciated by those of skill in the art that the CPUs can be any one of a number of conventionally available computers. For example, a 486- or Pentium based IBM personal computer utilizing a Windows based operating system.

The system and method of the present invention as used in a software program as illustrated provides for a display of information and allows of manipulation of data through formatted interface menus, providing a structured organized system for roll management. The interface menus allow the user to change data on an interactive display for selecting options.

As rules are ordered and received within the rolling mill, all pertinent information is entered into the system at the main computer 12 and assigned to storage locations such as the roll shop to become available in the data base 14 for use in specific roll families.

Configurations are formed by the user to define the required line up of rules for rolling of each product size. Families are then created within the system through automated sorting of the available rolls in the data base and user selection of pairs of rolls to be assigned to the families.

As the family is assembled, the database information for each roll being used is updated to indicate that it belongs to a family and therefore cannot be considered for any other family. The storage location for the roll is included in the family data table and a report can be printed showing the physical location for all rolls in the family.

When completely assembled, the family can be electronically transferred to the mill computer 20 for display at the mill pulpit. In the pulpit, all useable families can be displayed on the operator display 26 along with storage locations and collar diameters. When a family is selected by the operator for use in the next rolling sequence of the mill, the operator passes the family identifier and effective diameter to the mill computer for speed setup and tracking of tonnage. This electronics transfer of data reduces the chance of operator error.

After a rolling sequence or series of sequences, the mill computer passes information concerning tons rolled back to the roll shop computer 30. The roll shop computer uses this information to update the roll data base and system history files to track the usage of roll families.

In order for the system and method to operate, basic setup information about the operation of the mill and the roll shop must be entered into the computer database as data objects. This information consists of the information related to "grooves", "configurations", "drawings", "overall configurations", "suppliers" and "supplier qualities". All of this information, once entered, should be able to remain constant, barring any change to the product size and/or rolling practice.

Once this basic setup information is complete, the only information that will need to be maintained on a continual basis is the individual roll information. The roll must be entered initially when new and then, every time the roll is either used to roll steel or ground the results of this operation must be communicated to the computer. The system will also help the roll shop in constructing the groups of rolls ("families"), optimizing this time consuming process for minimal waste of both time and material, while holding the diameters of the rolls in an equipment in accordance with the required ratio relationships. Further, it will also assist them in choosing the best families to be used to roll specific product sized in the mill ("sequences").

Data Object Definitions

Initially it will be necessary to define certain of the data objects utilized in the system of the present invention. They are as follows.

The groove data objects are the geometry and attendant data associated with the actual groove cut into the roll. This data will tend to remain static after the mill becomes operational. This set of data includes the following data: the type of mill the groove is associated with; name of groove; type of groove (shape); face width of groove; depth of groove; bottom radius of groove; relief radius (i.e., corner radius) of groove, open angle of groove; relief multiplier for groove. These objects are preferably user defined in the system.

The roll type data objects correspond to the physical description of the roll blank. There are usually several different roll dimensions used for a given stand, and there are also a number of different stand configurations used by different mills. The roll type object includes the following data: new diameter; discard diameter; number of grooves possible; thickness of roll (barrel width). These objects are preferably hard coded into the system based on the particular mill using the system.

The housing data objects define the physical constraints of a given housing. It includes the following data: housing name; separating force capacity; torque capacity; eligible roll types for this housing. These objects are preferably hard coded into the system based on the particular mill using the system.

The equipment layout data objects define the pieces of equipment used in the mill. It defines the number of stands in a given piece of equipment, and also assigns a housing type to each. These objects are preferably hard coded into the system based on the particular mill using the system.

The drawing data objects establish which grooves are to be placed on which roll types, and with which other grooves if applicable. The drawing object combines the roll object with some number of groove objects (not exceeding the number possible for the roll to handle but possibly less). It is a relatively arbitrary grouping in that it can be defined any way the user desires, but it should be established such that it promotes optimal utilization of the rolls available. This optimization is largely a result of the particular order that a mill has and cannot be readily established until rolling practice is established. The only other constraints are that the groove(s) must physically fit onto the face of the roll within the tolerances for that roll type. This object will tend to remain constant after the initial tuning and operation of the mill has begun. The drawing object contains the following data: drawing number; drawing suffix; roll type references; number of grooves actually on this drawing; and the name and mill type of each groove associated with the drawing. These objects are preferably user defined in the system.

The configuration data objects specify the grooves necessary for a given piece of equipment to roll a particular size. These definitions come from a rolling schedule. The configuration object contains the following information: entry size into the mill; delivery size from the mill; the first stand used; the last stand used; and the total allowable roll size deviation. This object will tend to remain unchanged after initial startup has ended. The following data is carried with the configuration object for each stand in the particular piece of equipment: the groove name and type; allowable roll size deviation; interstand roll compensation; estimated roll life, in tons; roll parting. These objects are preferably user defined in the system.

The overall configurations data objects are a list of the individual configurations required to roll a given size through the mill. They require the entry size of a configuration to be equal to the delivery size of the preceding configuration. This object will tend to remain unchanged after initial startup has ended. The size rolled by the overall configuration will be equal to the delivery size of the last configuration in the list. These objects are user defined in the program.

The supplier data objects track information about a particular supplier of rolls for the roll shop. It contains supplier address and contact information. These objects are preferably user defined in the program.

The quality data objects contain information about the chemistry of the materials obtained from the supplier. A given supplier may have several different qualities defined for it. The reason for this object is that different chemical compositions are suited for different locations in the mill, and may or may not be different costs. The ability to track roll usage with respect to the different chemistries may be useful to the mill in deciding which qualities to order for future use. These objects are preferably user defined in the program.

The roll data objects combine the drawing object, the supplier object and the supplier object with data about the physical condition of the roll. The roll object will change every time the roll is ground or used to roll steel. The roll data includes the following: supplier index; current drawing index; current roll diameter (this will change as the roll goes through grinding cycles); roll position (whether it is in the roll shop or on the mill); roll storage location with the roll shop; quality index; purchasing information; availability index (i.e., whether or not the roll is included in a family). In addition, information about the following is kept for each groove in the roll: groove condition (this will depend primarily on visual inspection of the roll); tons rolled on the groove; and percent of life used on the groove. These objects are preferably user defined in the system.

The family data objects specify which particular rolls must be used to create a given configuration. This object will change whenever the family is used to roll steel or if a roll is added or removed from the family. It includes the index of two rolls per stand for each stand used in the specified configuration. These objects are preferably user defined in the system.

The sequence data objects track which families will be used to define an overall configuration. This object will be a rolling list of data changing daily as the mill rolls more product. Whenever a sequence is rolled and it's families returned to the roll shop the information will be deleted from the database. These objects are preferably user defined in the program.

Outline of System Use

The system is divided into two main categories of use. The first is "setup" and the second is "operation".

The setup stage of the system provides a setup interface menu for the user, and covers the following user interface submenus: grooves, configurations, drawings and overall configurations. These menus lead to the corresponding interfaces for dealing with the objects named in the menu. They are grouped under the setup menu because they are, for the most part, static once the mill is in operation.

The operation stage of the system provides an operation menu for the user, and covers the following user submenus: rolls, family, grind queue and sequences. These menus lead to the corresponding interfaces that manage these objects. These objects will change continuously during the course of mill operation.

Figure 2:
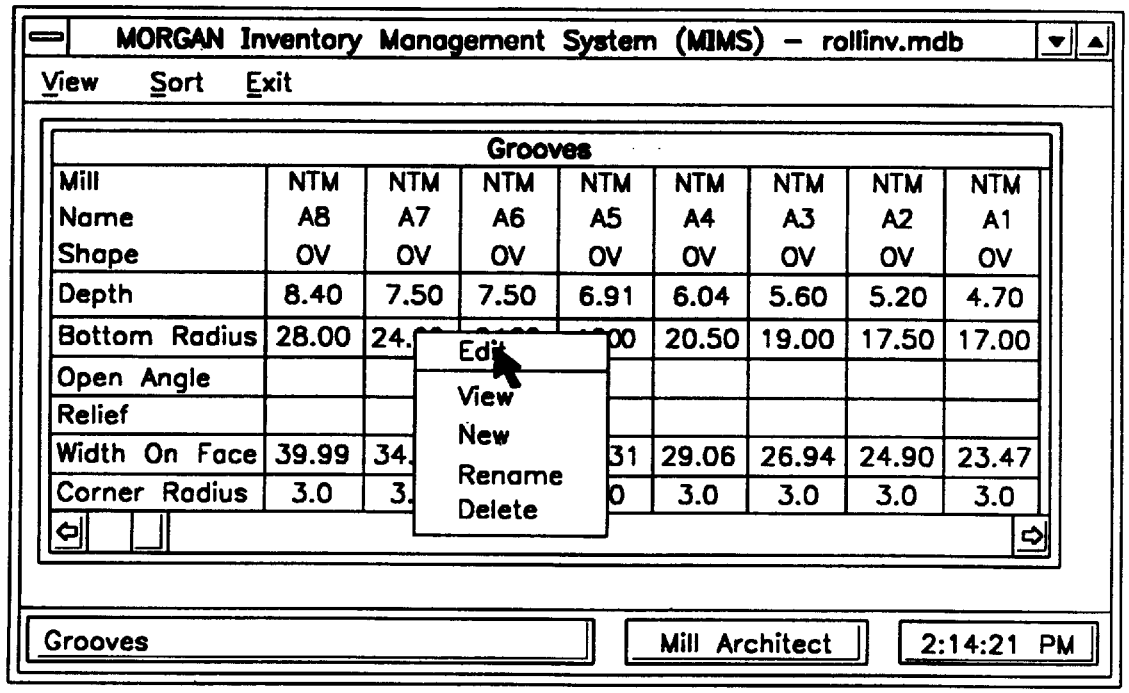
FIG. 2 shows a groove interface menu in accordance with the present invention.

The "groove interface", as shown in FIG. 2, is where all groove definitions are manipulated. It's basic form is a listing of the summary information for every groove. There are two display menus at the top of this window: view and sort. The view menu allows the user to pick the pieces of equipment for which the user wants to see grooves. The sort menu allows the user to pick the particular groove definition item that the user wishes to sort on.

Groove operations are performed via a pop-up menu that is displayed by clicking on a selected groove. The top cell in the column for a selected groove will have a colored background, e.g. red (this is the cell that the user will drag for later groove selection operations). The following commands can be performed on a groove object: edit, view, new, rename and delete. Edit and view bring the user to the "groove edit" interface. This will be discussed in more detail hereinafter. Choosing "new" prompts the user for a piece of equipment to associate the groove with as well as a name. When the user has entered that information, the system will load the groove edit interface. Rename allows the user to rename the groove. Delete allows the user to delete that particular groove from the database. The groove must not be referenced in either a drawing object or a configuration otherwise the user will not be able to delete it.

The "groove edit interface" is a detailed view of the contents of the groove object. If the user has entered it in edit mode, the user will be able to change the information and either save it or exit. If the user has entered in view mode, then the user will not be able to make any changes.

Figure 3:
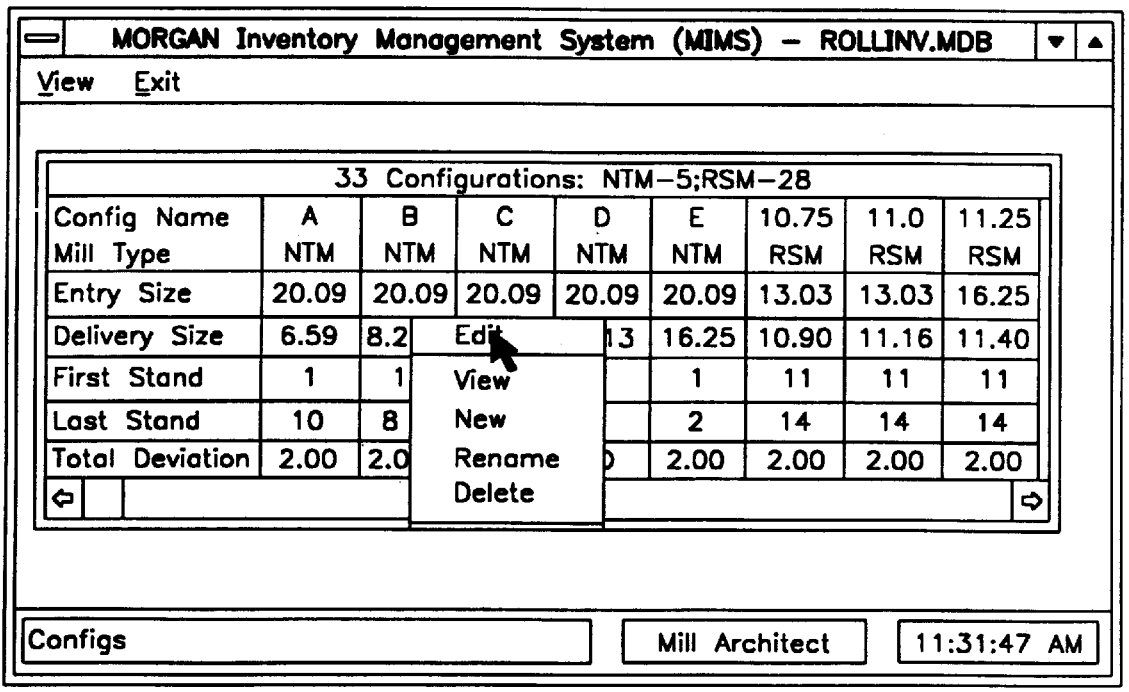
FIG. 3 shows a configuration interface menu in accordance with the present invention.

The "configuration interface", as shown in FIG. 3, is where all manipulation of configuration data objects is done. The interface is a listing of the summary information for each configuration defined in the database. There is a view menu at the top of this window which determines the pieces of equipment for which configurations are shown.

Configuration operations are performed via a pop-up menu that is accessed with a mouse button click. This menu will operate on the currently chosen configuration. The top cell in the column for a selected current configuration will have a colored background (this is the cell that the user will drag for later configuration selection operations). The menu contains the following commands: edit, view, new, rename and delete. Both the edit and the view menus bring the user to the "configuration specifics" interface, which is discussed hereinafter. Choosing "new" prompts the user for a piece of equipment to associate the configuration with as well as a name for the new configuration. The system then creates a blank configuration which the user must fill with information via the edit function of the menu. Rename allows the user to change the name of the configuration. Delete allows the user to remove the configuration from the data base. The user may not delete a configuration which is referenced by a higher level object such as an overall configuration or a family.

The "configuration specifics interface", as shown in FIG. 4, can be accessed in two modes: view and edit. In view mode none of the information associated with the configuration can be altered. In edit mode, the user may alter any information except for the name and mill type. Edit mode can only be reached from the configuration interface. View mode can be reached from several other interfaces that deal with configurations.

To alter the entry size, delivery size or total roll diameter deviation allowed for the family, the user will type the new value into the corresponding input field at the top of the window.

To select a new groove or change a current groove, the user will click the mouse in any of the first three columns of the grid. This will load the groove interface and allow the user to choose the groove that the user wishes to apply to the configuration. The user will then drag the colored cell at the top of the groove that has been chosen into the stand that the user wishes to use it in. When it is over the stand that is desired, the user drops it and it will be applied. If the user wishes to dummy a stand that currently has a groove applied to it, the user will simply click the mouse button, after selecting the stand, and choose the "dummy stand" option.

To change roll parting, roll deviation, roll compensation or estimated roll life, the user will click on the field that is desired to change. This will show a pop-up menu which has the single choice "edit field". The user will click on this and enter the new value for that field. Both roll deviation and roll compensation have no value allowed for the last stand of the configuration. This is due to the fact that this information relates to interstand values.

The "drawing interface", as shown in FIG. 5, is where drawing objects are manipulated. It is designed as a scrollable listing of all the drawings in the database. There are two tools for working with the drawings in a list format. The first is the "sort" menu. This allows the user to sort the drawings either by number, suffix or roll type. The second is the "find" function. This function allows the user to locate drawings which contain a particular groove. To use this function the user clicks the find menu and then double clicks on the "select groove" panel. The groove interface is brought up and allows the user to select the groove that the user is looking for.

Individual drawing manipulation is achieved, as in the other interfaces, via a pop-up menu. This menu is activated by selecting a particular drawing and clicking the mouse button. To select a drawing, the user will click on the row that contains the particular drawing information. The user knows that it is selected when the left most field is provided with a colored background (the colored cell is to be dragged in later drawing selection tasks). The pop-up menu that appears can contain the following items: edit, stats, view, new and delete. If the drawing object is not referenced by any rolls, then all of the items will be available. If it is referenced by rolls, then the edit and delete functions are disabled. The edit and view menu picks bring up the drawing specifics interface with the selected groove information as described hereinafter. Statistics show how many rolls are defined based on the drawing. Choosing "new" brings up the drawing specifics interface with a blank roll ready to be created. "Delete" allows the user to remove the roll from the database.

Figure 6:
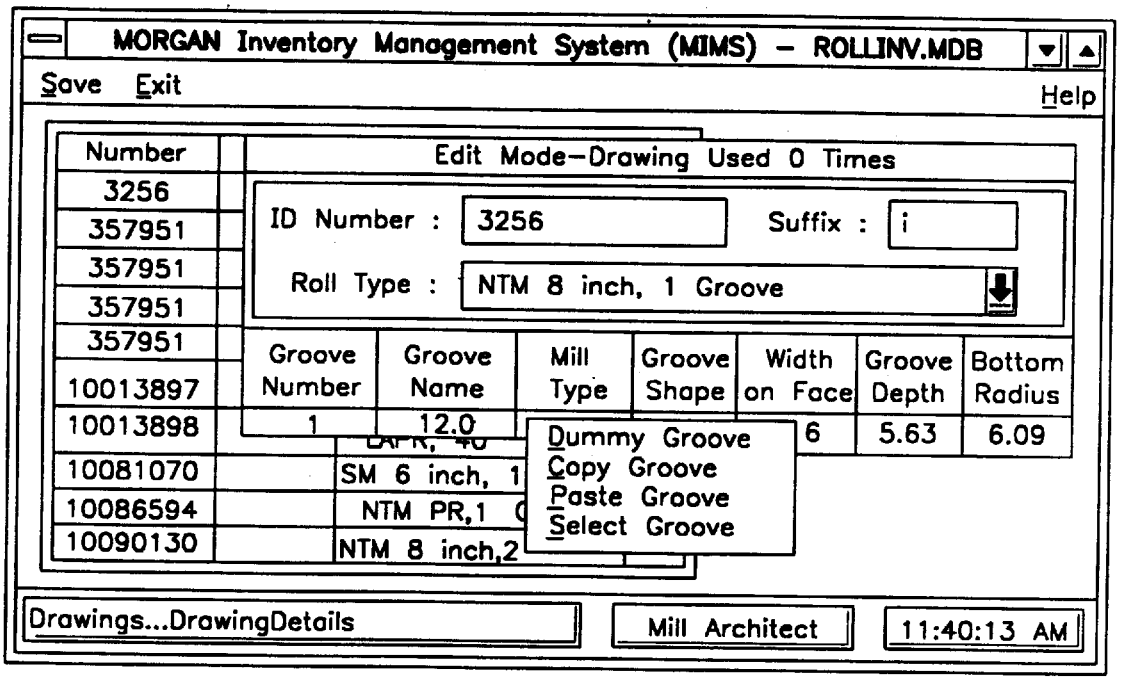
FIG. 6 shows a drawing specifics interface menu in accordance with the present invention.

The "drawing specifics interface", as shown in FIG. 6, contains all the information about the specified drawing object. This interface can be loaded in either edit mode or view mode. In edit mode, the information for the drawing can be altered, but in view mode it cannot. The only way to access edit mode is via the drawing interface.

The "ID Number" and "Suffix" fields can be changed by typing in the desired number or letter. To change roll type, the user pulls down the list of available roll types and chooses the desired one. The individual groove information is changed via a pop-up menu. The pop-up menu is obtained by clicking on the desired groove position. The pop-up menu gives the user the following options: dummy groove, copy groove, paste groove and select groove. Selecting the dummy groove menu option blanks the currently selected groove position. Selecting the copy groove option places the groove in the current position into a buffer which allows it to be pasted to another groove position. Selecting paste groove places the groove currently in the copy buffer into the current groove position. Selecting paste groove places the groove currently in the copy buffer into the current groove position. Choosing the select groove brings up the groove interface and allows the user to select any of the defined grooves by dragging the groove cell and placing it in the desired groove position.

When the user has made all the changes that are required, the user may select the save menu at the top of the window to update the database. If the user wishes to discard the changes, the user will choose the exit menu and they will not be reflected in the database.

Figure 7:
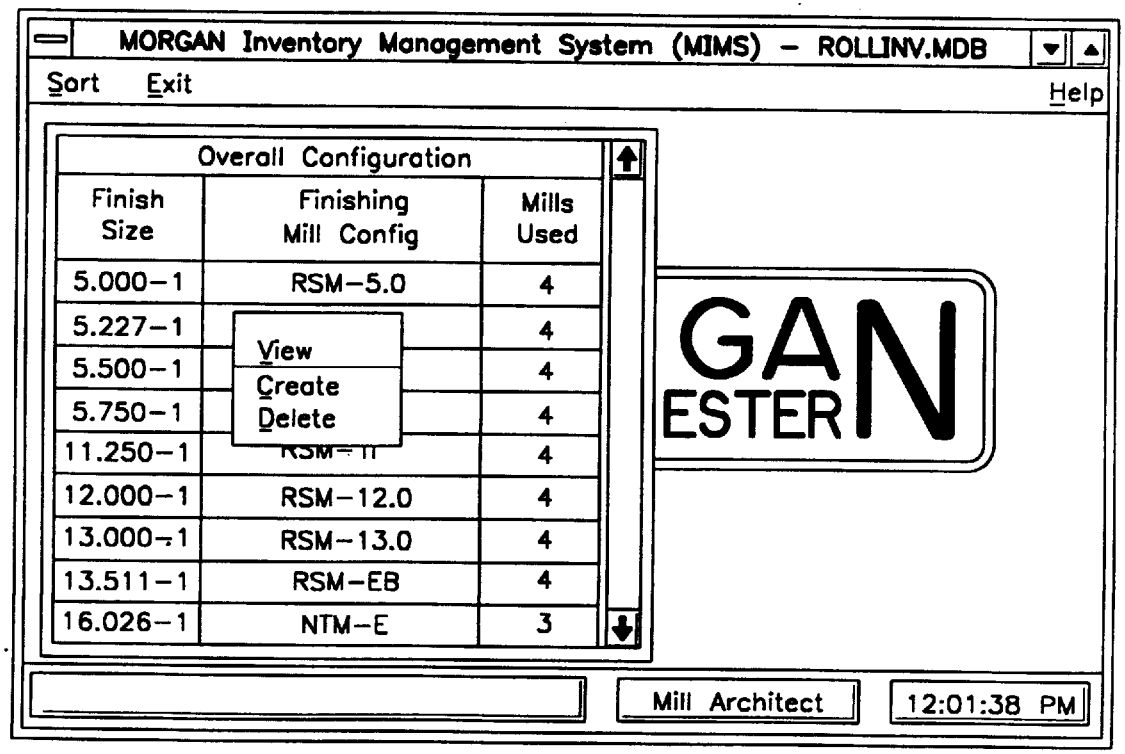
FIG. 7 shows an overall configurations interface in accordance with the present invention.

The "overall configurations interface", as shown in FIG. 7, allows the user to manipulate and view the overall configuration data objects. Summary information about all the overall configurations in the database are listed in a scrollable grid. The window has a sort menu which can be used to change the sort order of the listing.

Manipulation of the particular overall configuration is achieved via a pop-up menu. As with the other interfaces, this menu is activated by clicking the mouse after selecting an overall configuration by clicking on the row of the overall configuration. This menu includes the following options: view, create and delete. Selecting either view or create takes the user to the overall configurations specifics interface, which is discussed in more detail hereinafter. Selecting "delete" removes the currently selected overall configuration from the database. The user may not delete an overall configuration if it is referenced by a sequence data object.

Figure 8:
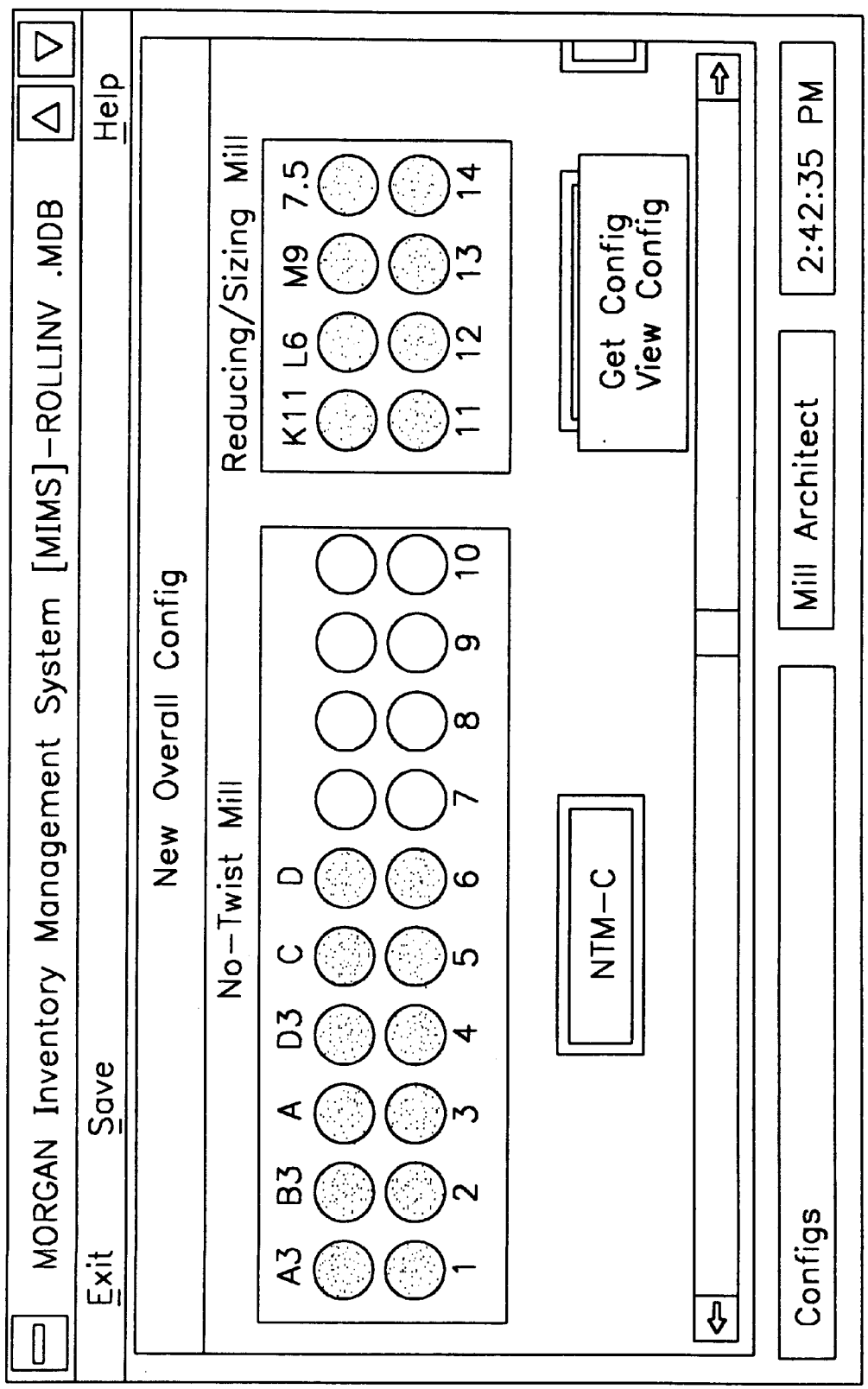
FIG. 8 shows an overall configuration specifics interface in accordance with the present invention.

The "overall configuration specifics interface", as shown in FIG. 8, allows the user to view and create new overall configurations. The interface has two modes, view and create. The user is preferably not allowed to edit an overall configuration data object.

This is a graphical interface with little interaction required. The different pieces of equipment are labeled. The individual stands have the name of the groove that is used listed above the two rolls. If the stand is dummied, then the circles are shown empty. The name of the "family" is listed in the frame just below the graphic of the equipment. Clicking on this box brings up a pop-up menu with two choices: get config or view config. The get config choice is only visible when this interface is entered in the create mode. Get config loads the configuration interface and allows the user to choose a configuration to add to the overall configuration. If the user chooses a RSM configuration first, the system will fill in the other configurations based on size constraints. If the user chooses a NTM configuration first, the system will dummy the RSM. Clicking view config will load the configuration specifics interface with the current configuration in view mode.

The "roll interface", as shown in FIG. 9, is where all manipulation of roll data objects is done. It is organized as a scrollable list of rolls and is controlled by a view and sort menu. The view menu allows the user to suppress display of either free rolls (rolls unassigned into families) or rolls that have been assigned to families. The sort menu allows the user to sort by any of the pieces of information displayed.

The individual roll objects are manipulated in a manner similar to that in the previous interfaces. First, a particular roll is selected by clicking on the row that contains the desired roll. The user then clicks to display a pop-up menu with the functions available for roll manipulation. The functions available are: new, delete, grind, view and move. Clicking the new menu item brings up the "roll create interface" as described hereinafter. The "delete" menu pick allows the user to delete a roll object from the database unless that roll is in a family or in the grind queue. Clicking "grind" brings the user to the "grind roll interface" described hereinafter. "View" activates the "roll view interface", also described hereinafter. "Move" allows the user to change the location pointer on the roll object.

Figure 10:
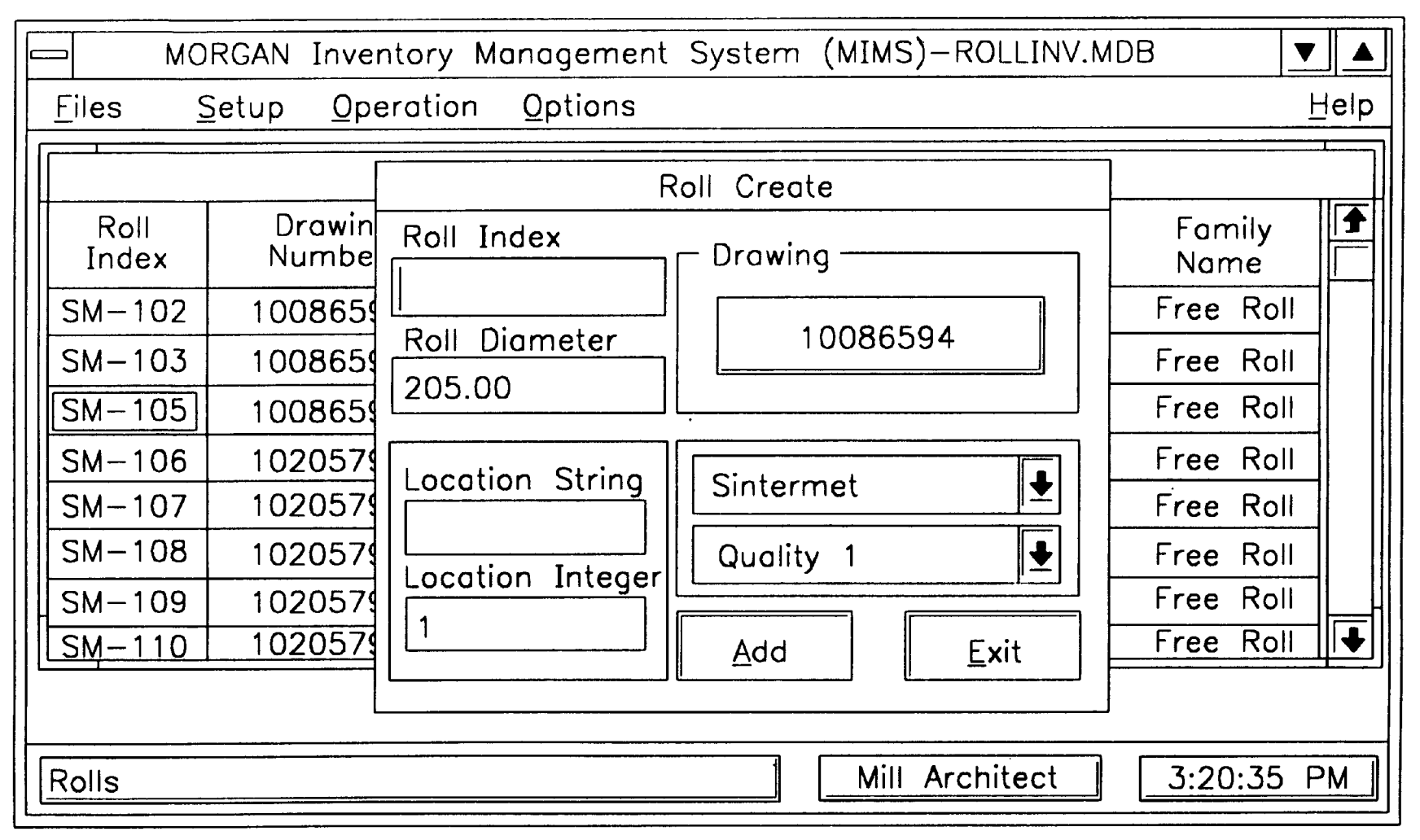

The "roll create interface", as shown in FIG. 10, is designed to allow the user to enter new rolls into the database. A roll index must be entered into the roll index field at the top left of the form. The "drawing" will default to whatever the drawing was for the roll that was currently selected when the roll create interface was activated. The default roll diameter will be the new roll diameter for the roll type object associated with the drawing. The user should also choose a roll manufacturer and chemistry from the pull down lists which contain all entered manufacturers and the defined chemistries.

The "location string" and "location integer" are an arbitrary designation designed to allow the roll shop to indicate the location of their rolls consistent with the practice in their shop. The location is set to be a maximum of five characters and the location integer must be between 32,000 and −32,000.

When the fields are filled in to the user's satisfaction, pressing the "add" button will cause the roll to be added to the database unless there is a duplication roll index/manufacturer. The roll create interface will stay active after the roll is added to the database. The roll index field will be blank, but all other information will stay the same. The system is designed this way to facilitate entry of several similar rolls.

After the user is finished entering new rolls, the exit button is clicked. This will close the roll create interface and refresh the roll interface with the newly created rolls.

Figure 11:
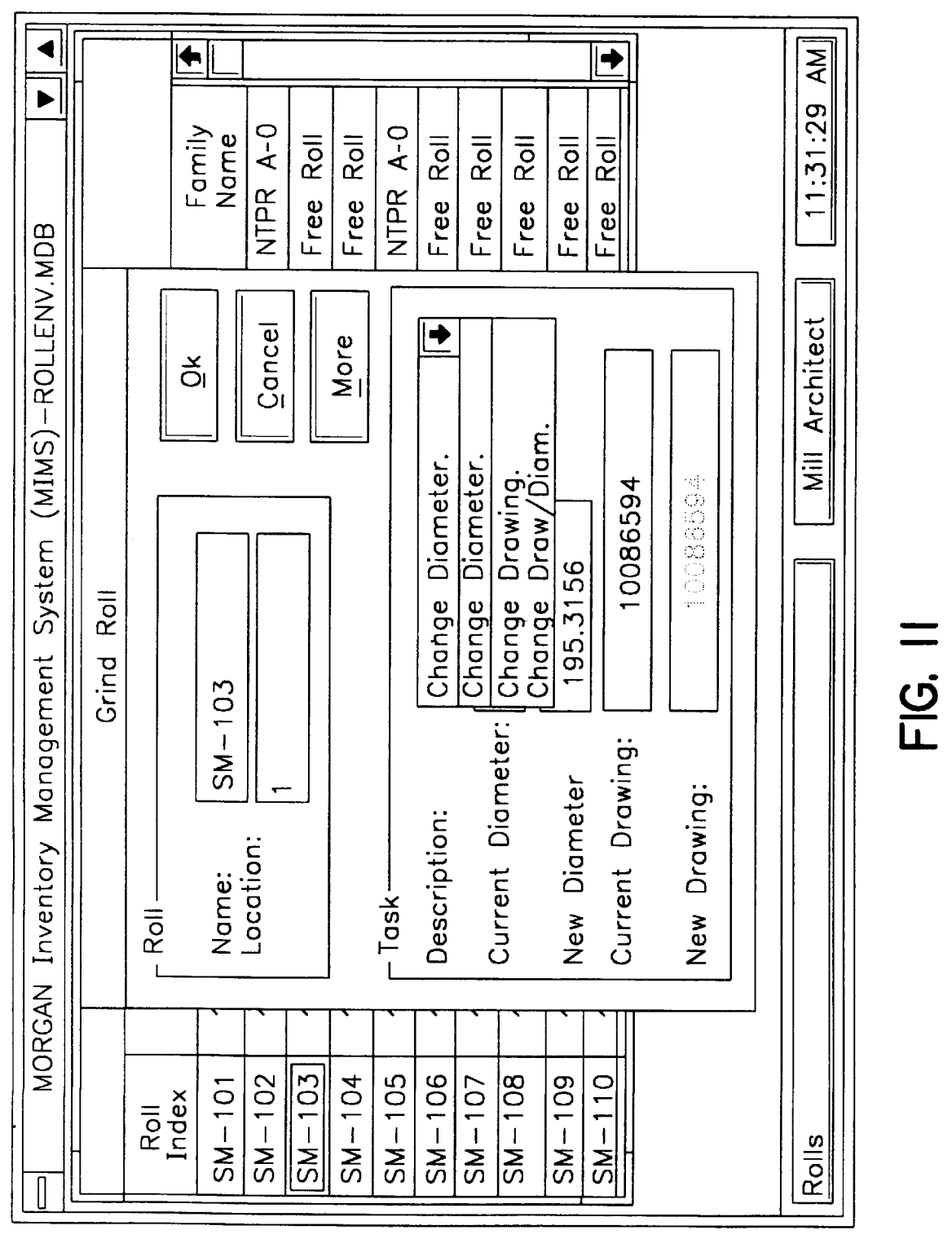

The "grind roll interface", as shown in FIG. 11, allows the user to send a single roll to the grind queue. There are two basic actions to choose from. The user may change the diameter of the roll or the drawing of the roll. They may both be changed at the same time as well. This action is selected via the pull down list which is entitled "description". If a diameter change is desired type the new diameter in the field labeled "new diameter". If a drawing change is requested, the frame to the right of the "new drawing" label is clicked. This will load the drawing interface, allowing the user to select the desired drawing. When the user has chosen the appropriate drawing, the user will click on the row containing the drawing and then drag the colored cell from the drawing interface to the new drawing panel in the "grind roll interface". This panel should update and reflect the drawing change.

When all changes are complete, the user presses the "OK" button to place the roll in the grind queue with the new drawing and/or diameter data. Pressing the cancel button discards the changes and quits the interface. The "more" button loads the "roll view interface" for the currently selected roll.

The "roll view interface", as shown in FIG. 12, displays all the characteristics of the selected roll. The roll index and manufacturer initials are displayed in the title bar along with the roll type. The location field indicates whether the roll is in storage, in the grind queue or on the mill. The storage field indicates where the roll is stored in the roll shop. All of the grooves are listed individually with the name of the groove and the current condition of the groove.

The "move roll/family interface", as shown in FIG. 13, is a simple tool designed to change the location pointer for either a single roll or an entire family. If implemented from the roll interface, the user can change the location of a single roll only. If implemented from the "family interface", as described hereinafter, the user can change the location of every roll in the family.

To change the location, the user types in the new location string and the new location integer. To complete the change, the user presses the "move" button. If the user wishes to return to the original address, the "reset" button is pressed. At any time the user may hit the "cancel" button to stop the process.

Figure 14:
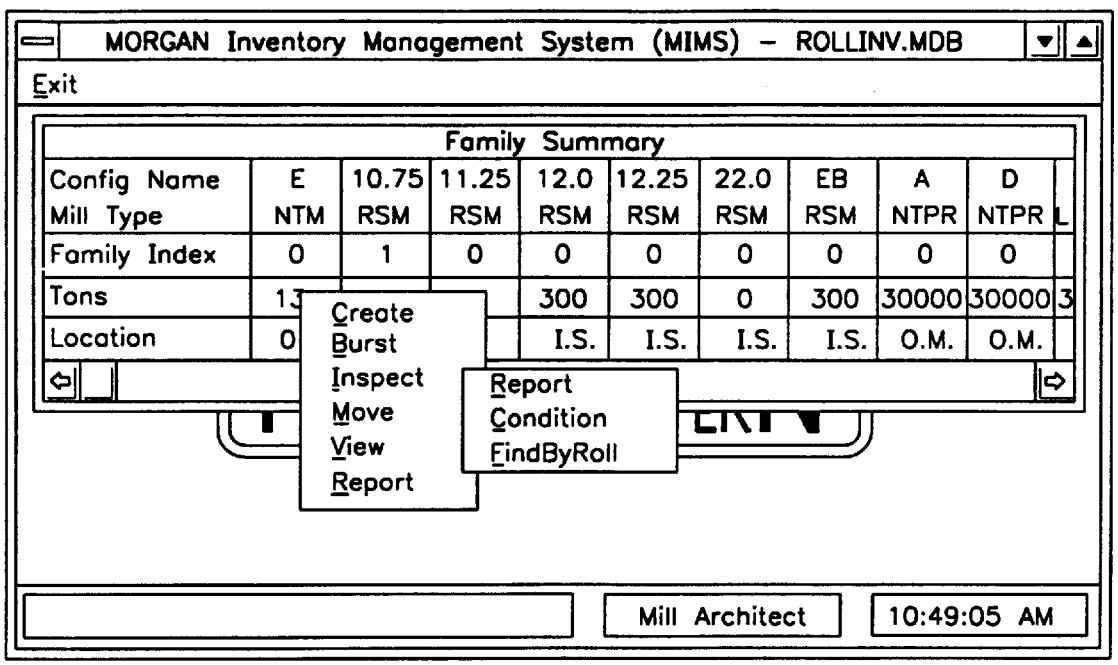
FIG. 14 shows a family interface menu in accordance with the present invention.

The "family interface", as shown in FIG. 14, is the central location for all the family manipulation tools. It is currently a scrollable list of all the families that have been created within the package. Summary information is available from within this window.

As with the other main interface windows, individual family manipulation is accessed via a pop-up menu. The pop-up menu is obtained by first selecting a family. The options available from the family pop-up menu are: create, burst, inspect, move, view and report. Clicking on "create" loads the "family create interface" as described hereinafter. Clicking on "burst" deletes the family object and all connectivity between the rolls in that family. The "inspect" submenu has two options: report and condition. Report generates a printout of all the rolls within the family so that the individual conditions of the rolls can be recorded in the roll shop. Condition loads the "family inspection interface" discussed below. Move loads the "move family/roll interface" discussed below. Clicking on "view" brings up the family view window which is discussed below as well. Finally, clicking on "report" will generate a hardcopy of the current family members and their condition.

Figure 15:
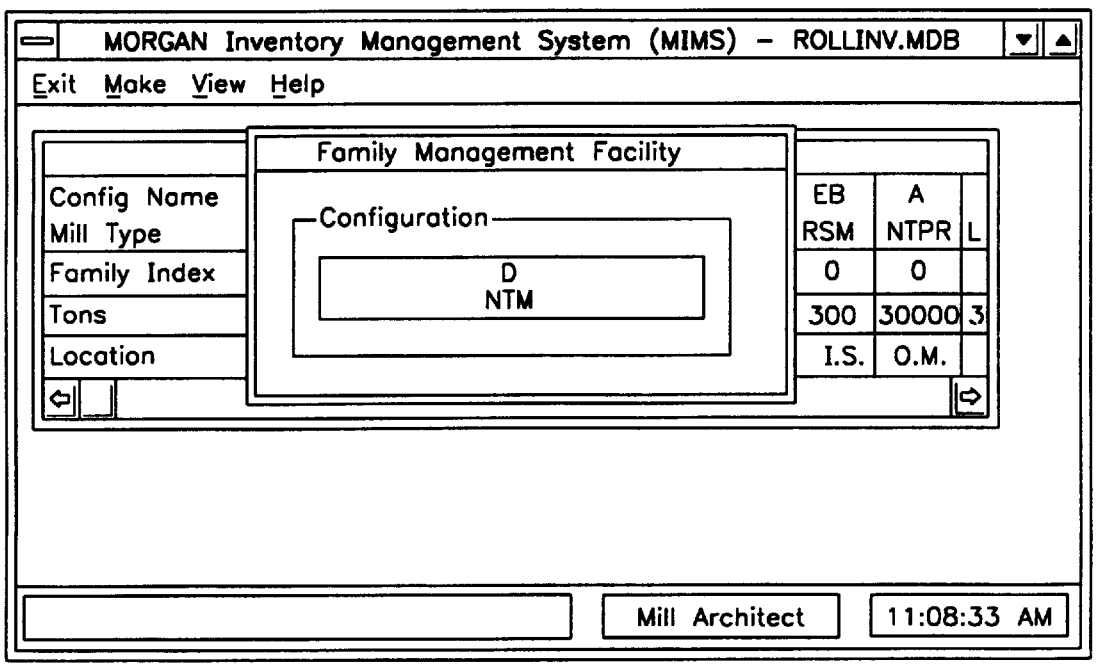
FIG. 15 shows a family create interface menu in accordance with the present invention.

The "family create interface", as shown in FIG. 15, is designed to allow the user to automatically create new family objects. The "configuration" frame is clicked on in order to create a family. This will bring up the "configuration interface in view mode and allow the user to choose the configuration for which a family is to be made. The configuration is dragged and dropped back to the configuration frame in the "family create interface". The "family create interface" is initialized with the configuration for whichever family was selected when the create menu was clicked on.

When the configuration that the user wishes to build a family for is in the configuration frame, the user may create the family desired. To do this the "make" menu item is clicked on. The system searches through all available rolls that fit on the physical stands and have the grooves required by the configuration. When it has found the suggested families, it will load the "new family select interface" as described below. The view menu is only available after the family make process has been successfully completed. If by the user exits the "new family select interface" before selecting a family, the user may reload that interface by choosing the view menu.

Figure 16:
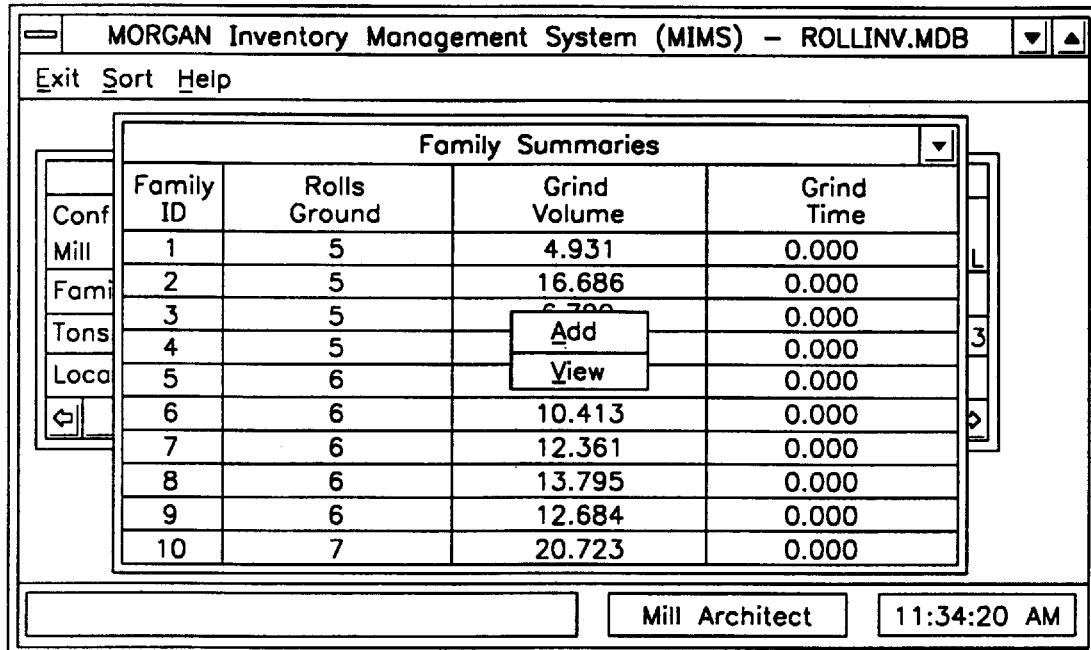
FIG. 16 shows a new family select interface menu in accordance with the present invention.

The "new family select interface", as shown in FIG. 16, is filled with the families that were generated by the automatic family selection algorithm. Information about the number of rolls needed to be ground, cumulative grind volume (currently calculated as cumulative grind depth) and cumulative grind time (currently not estimated) is listed in this interface. The families can be sorted by any of these factors by choosing the appropriate menu item from the sort menu.

As with almost all of the other interfaces, a pop-up menu gives access to the individual family functions. First, the family to be operated on is selected by clicking the appropriate row in order to bring up the pop-up menu. The menu has the following choices: add and view. "Add" adds the set of rolls as a new family. It will be the lowest available family index number for the family name. "View" loads the "family specifics interface" as described below.

Figure 17:
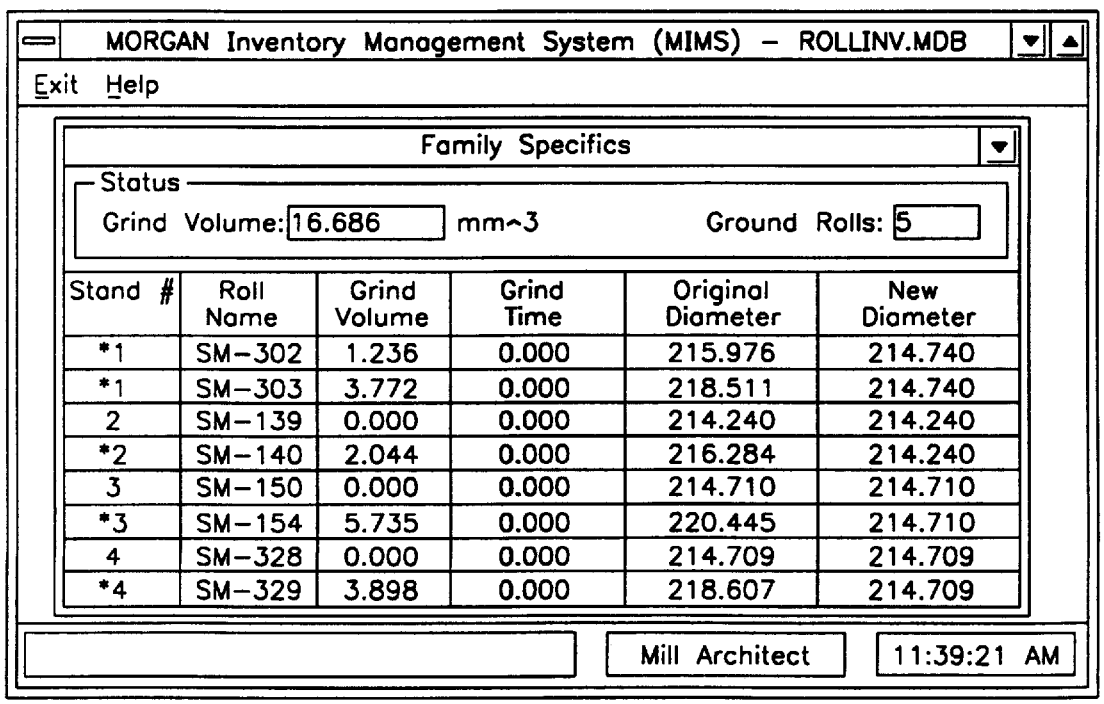
FIG. 17 shows a family specifics interface menu in accordance with the present invention.

The "family specifics interface", as shown in FIG. 17, is designed to show the user the specific grind operations necessary to complete the family on a roll by roll basis. All the rolls for all the stands are listed. If a roll is to be ground, the stand number appears with an asterisk and the grid volume will be a non-zero number (currently grind volume is actually grind depth). The top of the interface shows cumulative grind volume (grind depth) and the number of rolls that need to be ground to bring the prospective family into conformance with the tolerances spelled out in the configuration data object. Preferably, there is no manipulation possible in this interface. It is designed to give an overview of the roll operations only.

Figure 18:
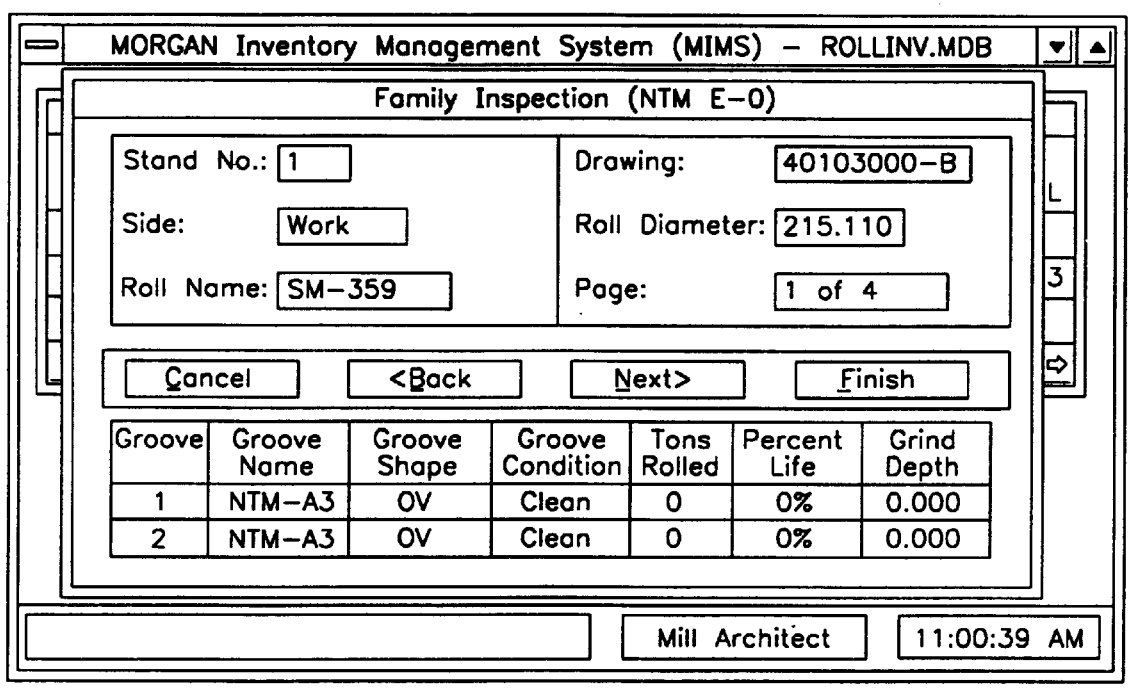
FIG. 18 shows a family inspection interface menu in accordance with the present invention.

The "family inspection interface", as shown in FIG. 18, is designed to allow the rolls in a family to be entered back into storage in the roll shop and to record the condition of the grooves on the roll. If the condition of the grooves/roll necessitates that the roll be ground, the family is processed through an algorithm which applies optimal grinding according to the tolerances and diameter compensations established for the configuration the family was created under.

Each groove for each roll must be checked. There is a report available from the "family interface" which prints a listing of all the grooves for all the rolls in the family with an area set aside to record the condition of the groove while on the shop floor. Each groove is then individually checked in using the "groove check-in interface" which is accessed by clicking on the row of the groove the user wishes to select. The user can navigate between the rolls of the family by clicking the "back" or "next" buttons to proceed to either the previous or next roll.

When all the rolls have been checked in, the "finish" button is pressed. This will allow the system to evaluate the need for grinding for all the rolls and will then enter rolls into the grinding queue as necessary and also mark the family as back in storage.

Figure 19:
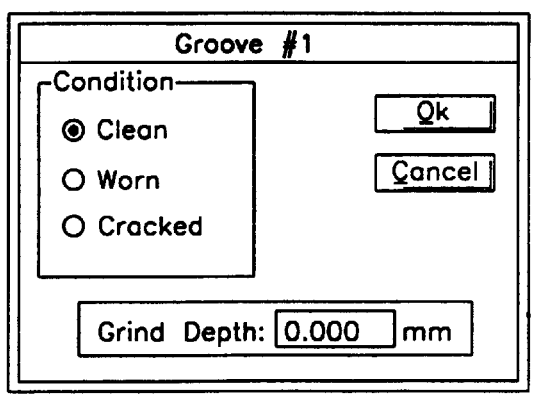
FIG. 19 shows a groove check-in interface menu in accordance with the present invention.

The "groove check-in interface", as shown in FIG. 19, allows the user to choose between three possible groove conditions and then give an estimated amount of grinding to correct the condition. There is a default number for estimated grind depth for each condition, but it may be overridden by the user. The automatic grinding algorithm uses these numbers when determining the grinding to be done on the entire family.

Figure 20:
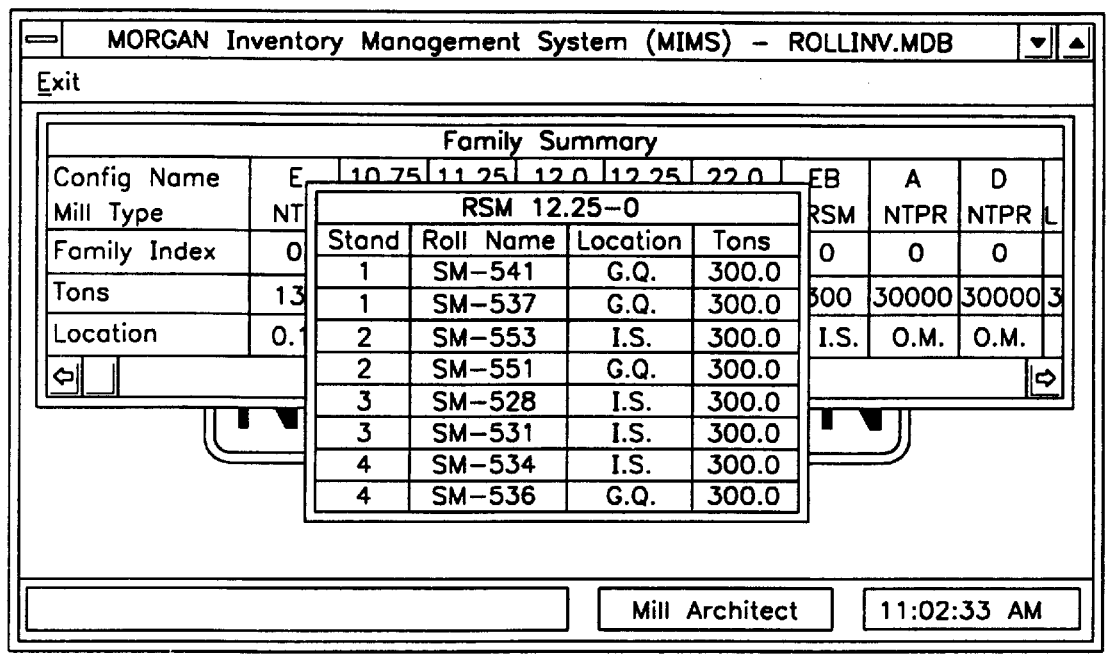
FIG. 20 shows a family view interface menu in accordance with the present invention.

The "family view interface", as shown in FIG. 20, allows the user to view all the rolls that are contained within the family. The "roll view interface" for the selected roll can be accessed by selecting the row with the desired roll.

Figure 21:
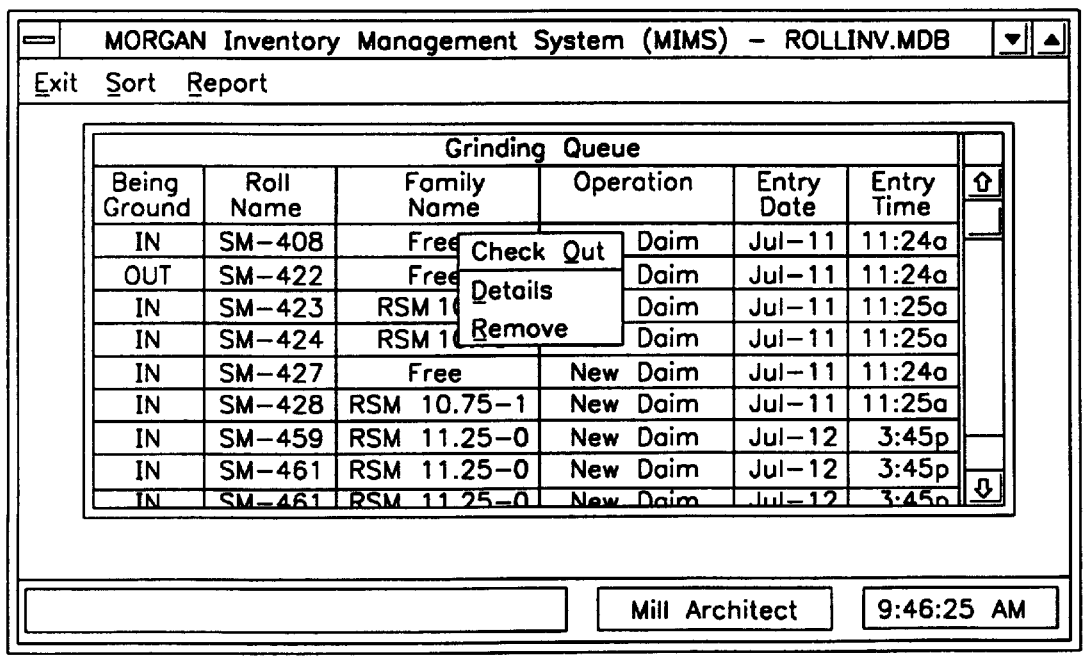
FIG. 21 shows a grind queue interface menu in accordance with the present invention.

The "grind queue interface", as shown in FIG. 21, is designed to allow the user to view information about rolls that have been selected for grinding. The user first checks out the rolls that they wish to grind. This flags the rolls so that they will not be checked out by another user. A report can also be generated that contains the information about the grinding operation to be performed. The system preferably allows either the drawing or the roll diameter or a combination of the two to be changed.

Clicking the sort menu allows the user to sort the listing of rolls in the grind queue by any of the different fields available. Clicking on "report" generates a text file that can be printed which includes all of the roll currently flagged as out. Individual rolls are accessed via a pop-up menu. This menu is obtained, as in the other interfaces, by selecting and clicking on the row of the desired roll. There are three choices in this menu: check out/in, details and remove. Clicking on "check out" will flag the roll as out so that grinding operations can be performed. When the roll has been flagged as out, this menu choice will appear as "check in" and will bring up the "grind queue check in interface" described below. Clicking on "details" will load the "grind queue detail interface" as described below. Clicking on "remove" will remove the roll from the grind queue.

Figure 22:
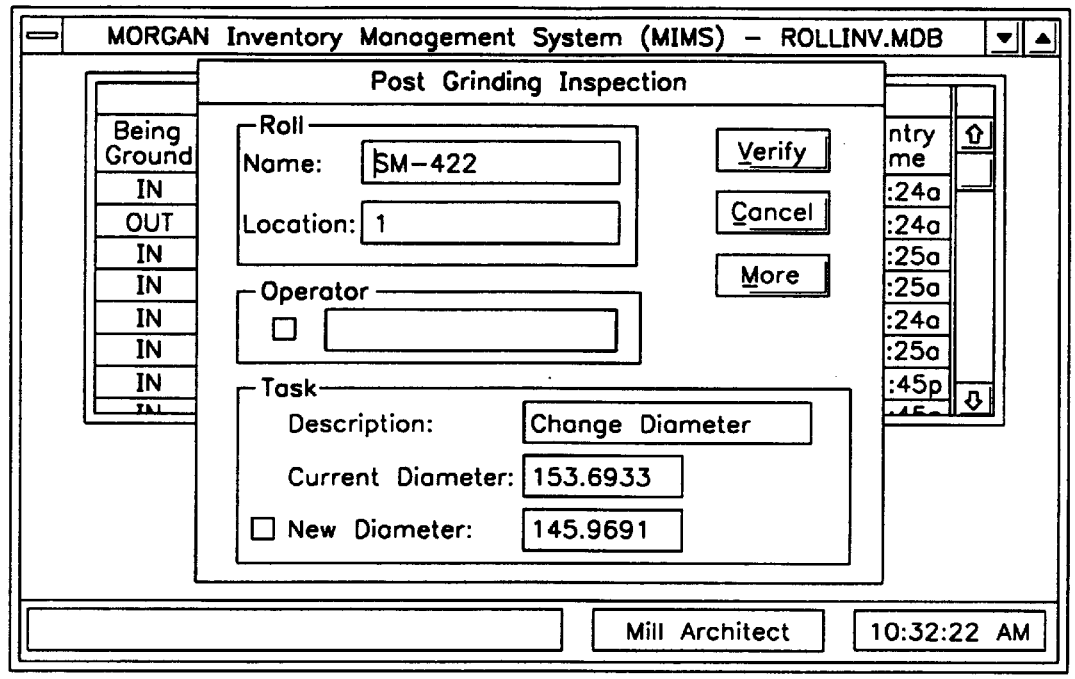
FIG. 22 shows a grind queue check in interface menu in accordance with the present invention.

The "grind queue check in interface", as shown in FIG. 22, is used to tell the program what operations have been performed during grinding. There are two checkboxes that must be checked before the "verify" button can be pressed. The user must enter initials or some other identifier in the text box under "operator" (once entered during a session these initials are stored until the program is exited) and then click the checkbox. The user will change the diameter to indicate the actual diameter and then click the checkbox to indicate that the diameter is correct. After these two things have been done, the user can press the "verify" button to remove the roll from the grind queue and place it back into circulation. The "cancel" button allows the user to exit the interface without applying any changes.

Figure 23:
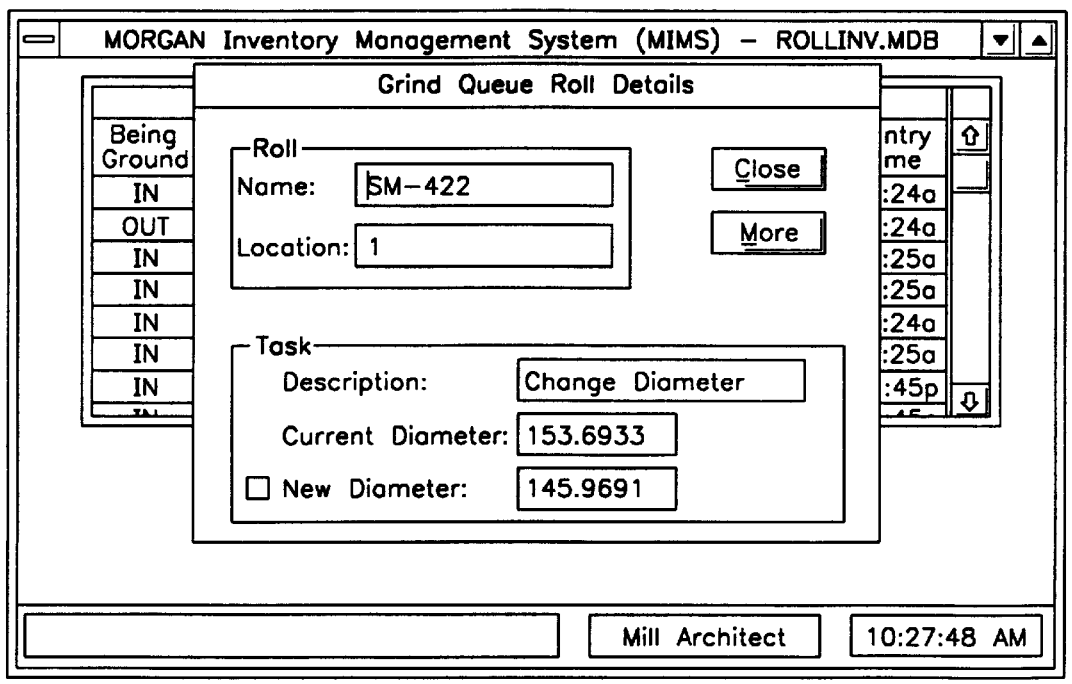
FIG. 23 shows a grind queue roll details interface menu in accordance with the present invention.

The "grind queue roll details interface", as shown in FIG. 23, shows the desired grinding actions to be performed to the roll. It is not an interactive interface.

Figure 24:
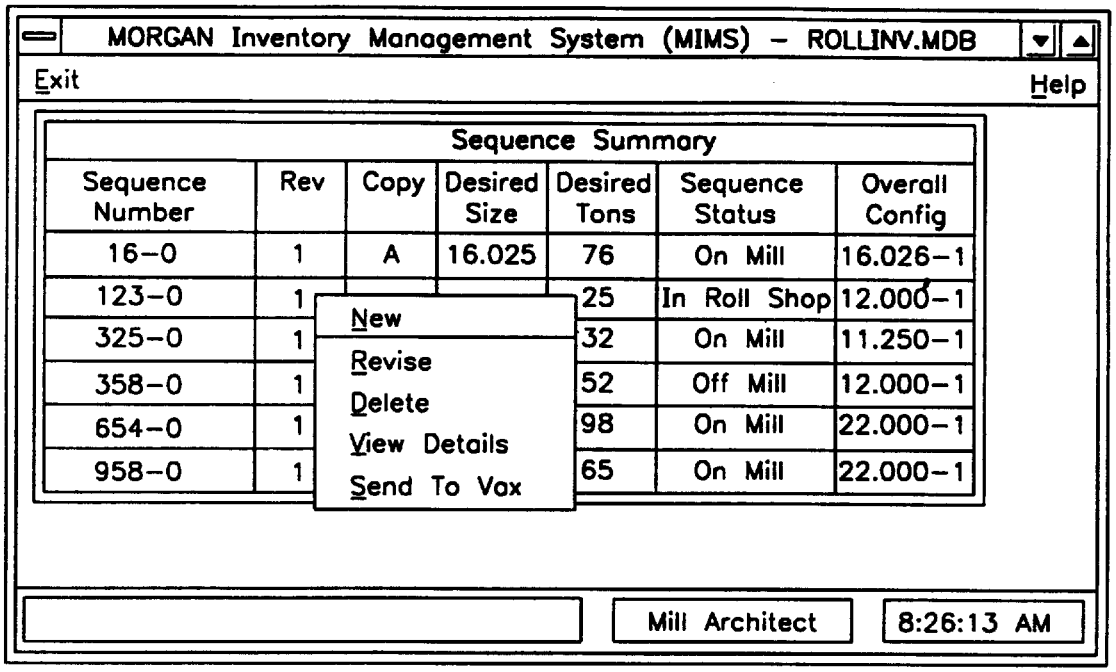
FIG. 24 shows a sequence interface menu in accordance with the present invention.

The "sequence interface", as shown in FIG. 24, is designed to control sequence data objects. This interface lists all created sequence objects and their current status. They are always sorted in order of sequence number.

As with the previous interfaces the sequence objects are manipulated via a pop-up menu. This menu is accessed by selecting the row containing the desired sequence. The options available will change depending on the sequence status. The choices are: new, revise, delete, view details, send to VAX or check in. "New" is always available and clicking it brings up the "create sequence interface" described below. Clicking on "revise" allows the user to change the desired size and tonnage for the sequence. This will also automatically increase the revision number by one and delete the original sequence information. "Revise" is available when the sequence is either in the roll shop or on the mill. The "delete" option can only be used when a sequence is in the roll shop or has been check in from the mill. "Delete" removes the sequence from the database entirely. "View details" will load the "overall configuration specifics interface" in sequence mode. This option is discussed in connection with the "create sequence interface" as described hereinafter. Clicking on "send to VAX" will create a special VAX transfer file and then copy that file via FTP over to the VAX. The sequence will then be flagged as being on the mill. The final choice is "check in". This is only available when a sequence is flagged as on the mill. It's purpose is to mark the sequence as off the mill so that further manipulation can be done.

Figure 25:
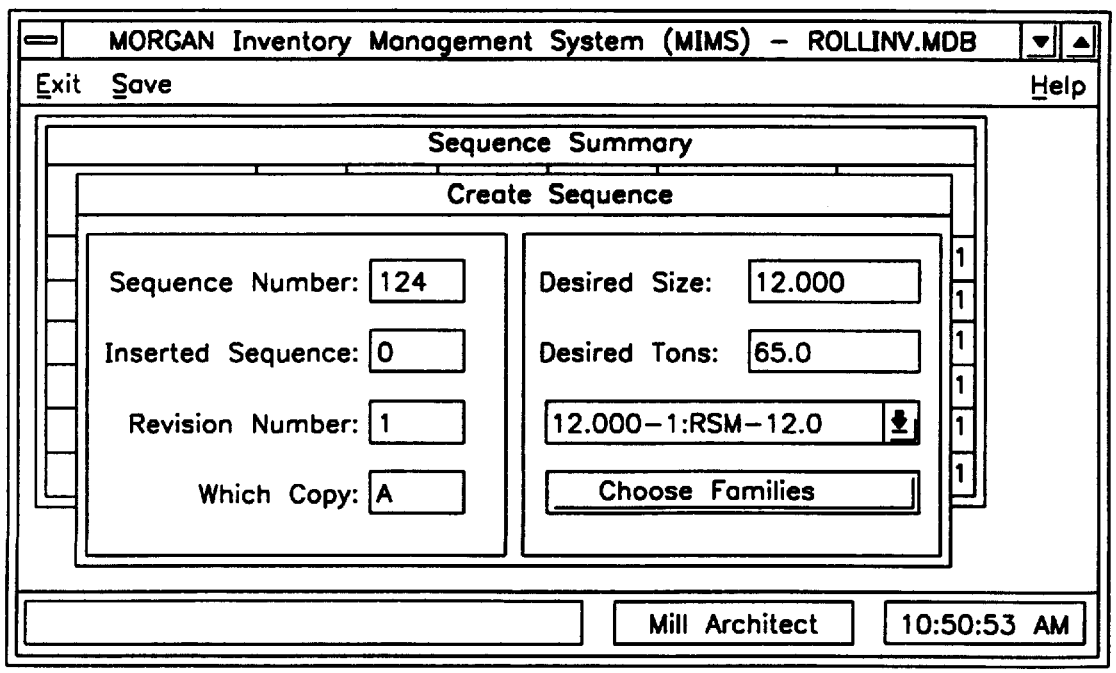
FIG. 25 shows a create sequence interface menu in accordance with the present invention.

The "create sequence interface", as shown in FIG. 25, is designed to allow the user to create a new sequence object. The user first enters the new sequence number in the sequence number text box and then presses enter. Until this is done, the rest of the interface will remain read-only. After the sequence number has been entered, the system will automatically fill the inserted sequence number at the next available number. The revision number will always start at 1 with a new sequence, and the copy is always A for this implementation.

After the sequence number has been entered, the desired size field is filled in. The system will then fill the combo box below the desired tons field with all the sequences whose finishing size fall within 0.25 mm of the desired size. The system will automatically select the first sequence that falls within 0.02 mm of the desired size, but the user may override this by selecting a different sequence from the combo box. Desired tons are also entered, followed by the user pressing the "return" button.

Figure 26:
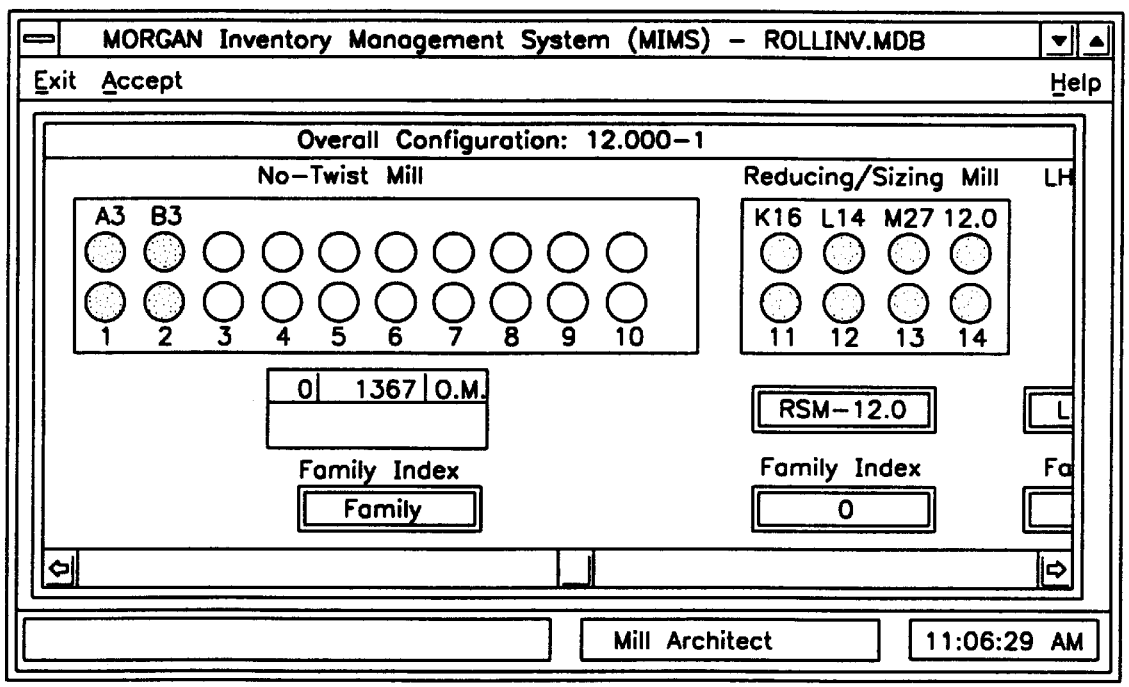
FIG. 26 shows a derived overall configuration specifics interface menu in accordance with the present invention.
Figure 27A:
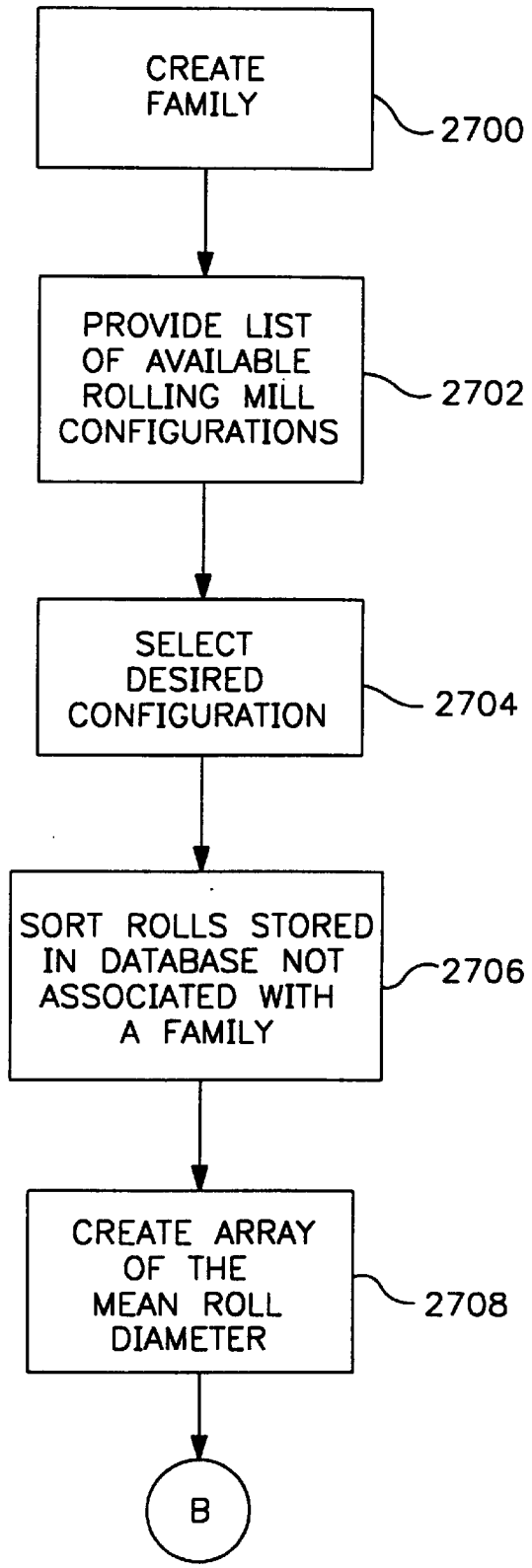
FIGS. 27A–27D shows a flowchart of an exemplary process of optimizing a family of rolls in accordance with the present invention.
Figure 27B:
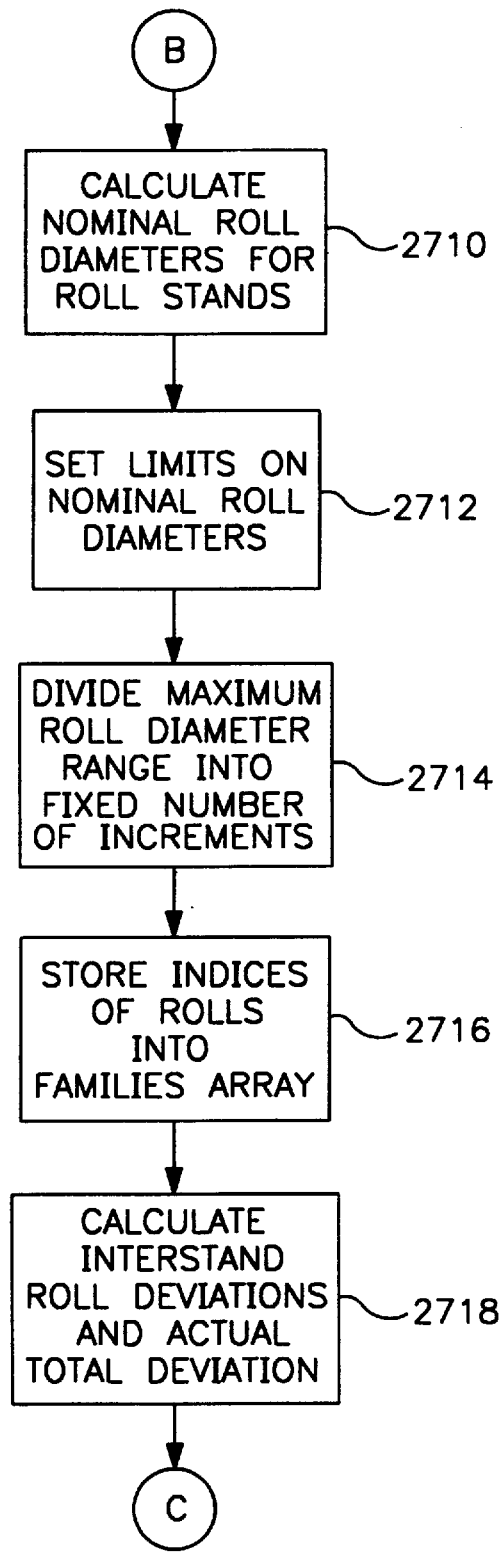
Figure 27C:
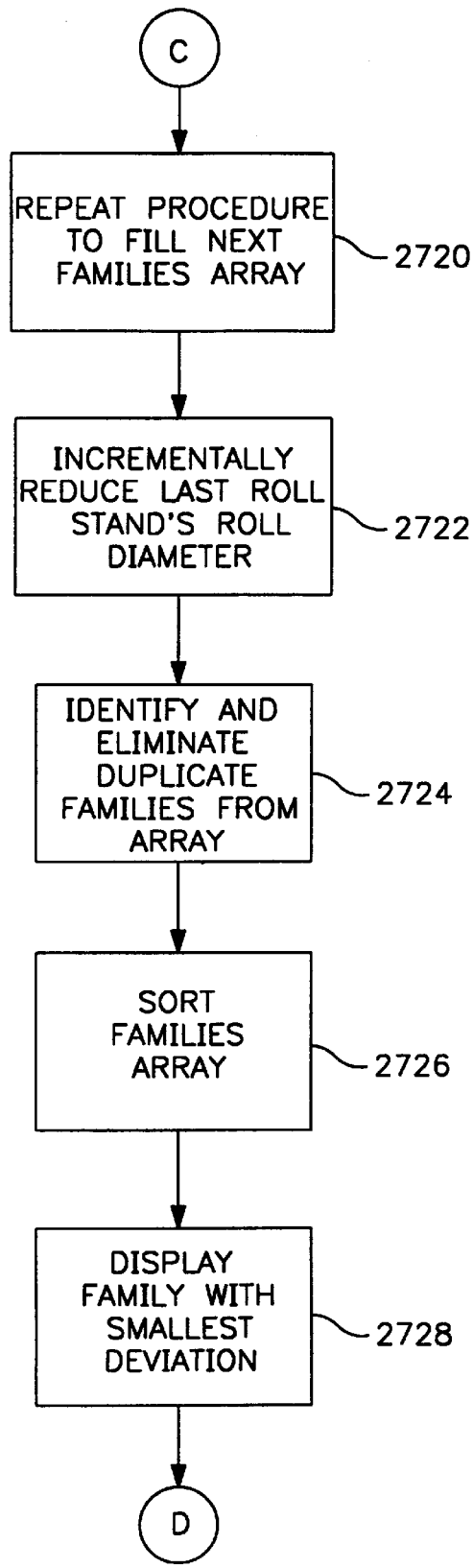
Figure 27D:
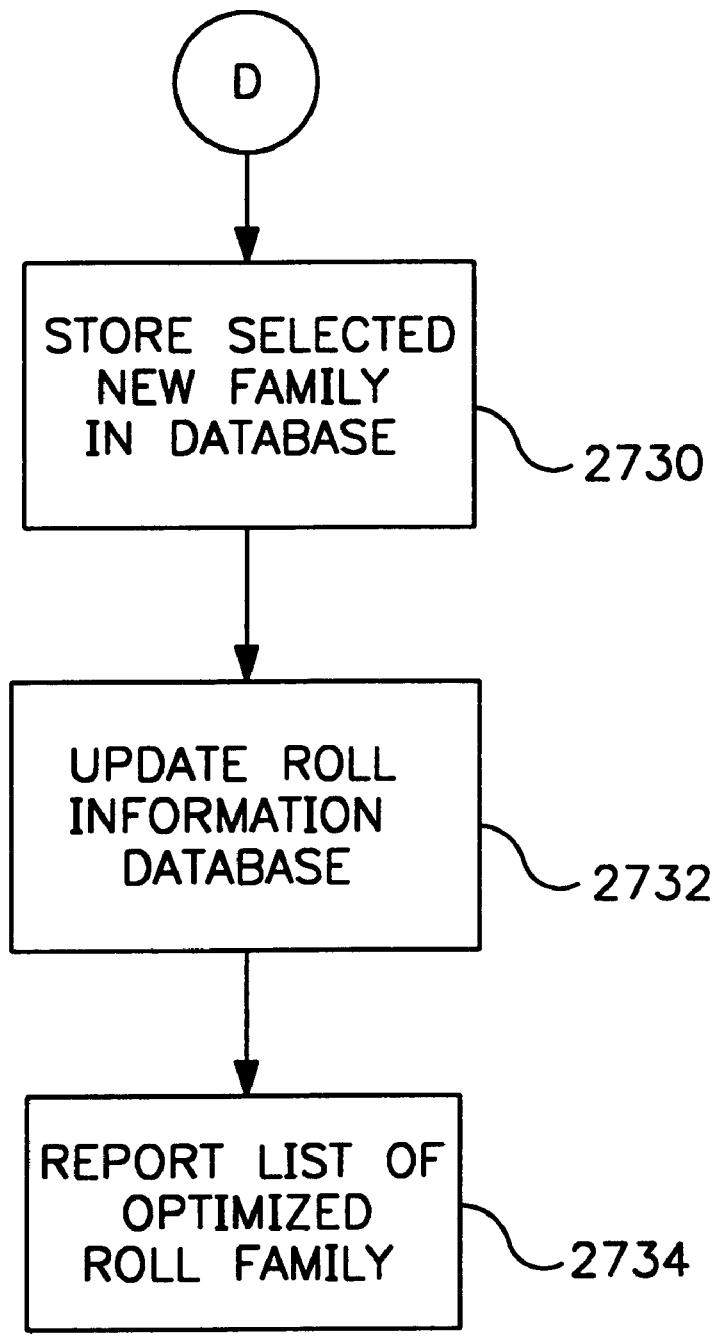

After these fields and the combo box have been filled to the user's satisfaction, the "choose families" button is pressed. This will bring up the overall configuration specifics interface" in family select mode. In addition to the information that appeared in the standard "overall configuration specifics interface", there will be a listing of the specific families that are available for the configuration as shown in FIG. 26.

The listing of families includes the family index, the available tons and the location of the family. In the above example, there is only one family, family zero, available for the desired NTM configuration. It has 1367 tons available and is currently on the mill. Clicking on this family will select it for use in the sequence. Selecting families is the only operation that can be preformed in this mode of the interface. When all of the pieces of equipment have had a family selected for them, the user will click the "accept" menu. This will result in the storage of these families for this sequence. The user can also click the "exit" button to ignore any changes made while in the interface.

When the user pressed the "accept" menu, the system returns to the create sequence interface. Pressing "save" will store all the new sequence information into the database and return to the sequence interface. Pressing "exit" will discard all new sequence information and return to the sequence interface.

Process of Optimization of Roll Families

As described heretofore, a family refers to a set of rolls that conform to the groove type, roll diameter and interstand roll deviation parameters, etc., defined in a rolling equipment's configuration. Once a roll has been placed into a family, it will remain in that family until it's roll diameter has been reduced to the discard diameter, the roll breaks or cracks beyond repair, or the operator deletes that family.

A family is created to maintain a constant relationship between the roll diameters from stand to stand in order to minimize the effects of interstand tension or compression (flutter) through the piece of equipment so as to improve section tolerance. As a result, regardless of the amount of wear inflicted on the rolls, all roll diameters will be reduced the same amount within the family in order to maintain the constant roll diameter relationship from stand to stand. The system and method of the present invention allows the user to create, delete or view roll families for the predefined configurations listed for the available pieces of equipment.

Based on the rolling mill configurations defined in the system, the user can automatically sort through all the available single previously used and end rolls, not currently associated with a family, and generate a list, based on roll diameter, of complete or partial families of rolls for a particular configuration.

The following data is defined in the selected rolling mill configuration:

Configuration Name—the alpha-numeric name of the selected rolling mill configuration for which a family or families are being created.

Entry Size—the hot equivalent round entry size into the rolling mill.

Delivery Size—the hot equivalent round delivery size from the rolling mill.

First Stand No.—the first stand used in the rolling mill.

Last Stand No.—the finishing stand used by the rolling mill.

Family Name—the name automatically assigned to the family after it is created. The name consists of the configuration name followed by the family number, i.e. A1, A2 etc. (note the family numbers are consecutive numbers)

Family Location—the storage location in the roll shop or rolling mill for all the rolls in the family.

Stand No.—the number of rolling mill stands from 1 to n.

Groove Type—an alpha numeric name identifying the pass geometry and dimensions for each stand.

Interstand Deviation—the maximum allowable deviation, in millimeters (mm), between the roll diameters of successive stands, defined in the selected configuration, and the actual measured interstand deviation after the roll pairs have been grouped into families.

Roll Diameter—the mean roll diameter, in millimeters (mm), of the displayed roll pairs.

Roll ID—the roll identification numbers of the rolls paired together.

Groove # n—the available life, in tons, for each pass cut into the rolls.

Warning—the system will warn the operator whether grinding is required for a particular roll to bring the roll diameters within the specified tolerances.

With reference now to the flowchart of FIGS. 27A–27D, the process of optimizing a family of rolls is described in accordance with the present invention. Initially, a decision must be made to create a new family (step 2700). Thereafter, the system provides a list of all the available rolling mill configurations (step 2702). The user must then select the desired configuration for which a family or families are to be created (step 2704).

Based on the selected rolling mill configuration, the system will sort (step 2706) through all the single used and new rolls stored in the roll database, that are not associated with any family, in the following order: (1) For each stand 1 through n, the system will sort through all the available rolls, regardless of roll diameter, based on the specified groove type name, defined in the selected configuration, and ordered in decreasing roll diameter, as shown in the exemplary table of FIG. 28; and (2) For each stand the system will then sort through those rolls with the same groove type name and create an array of possible roll combinations, within the allowable total roll diameter deviation of 0.05 mm. These roll combinations are then ordered and indexed based on decreasing mean roll diameter, as shown in the exemplary table of FIG. 29. The shaded matrix combinations are not valid due to the roll deviations being greater than +/−0.05 mm.

After the above sorting step has been completed for all the rolling mill stands, a new array will be created containing the mean roll diameters from the array of rolls for each stand (step 2608), as shown in the exemplary table of FIG. 30.

Figure 31:
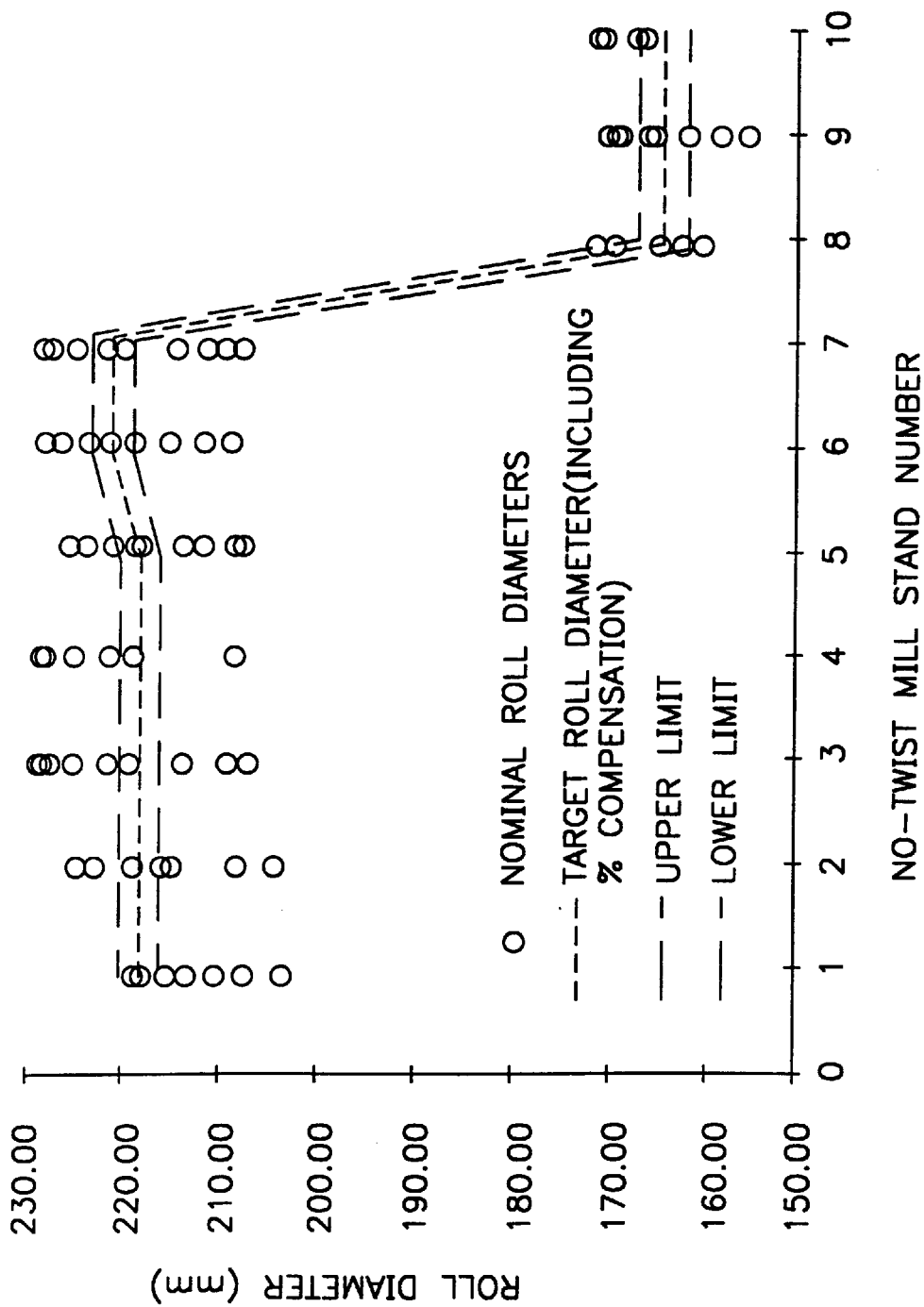
FIG. 31 shows an exemplary graph derived by the system of the present invention which includes limits set above and below the nominal roll diameters based on the total deviation defined in the selected rolling mill configuration.

Based on the percentage (%) roll diameter compensation defined in the selected rolling mill configuration and the last stands' new roll diameter, the nominal roll diameters for the upstream stands can be calculated (step 2710). Limits can then be set above and below the nominal roll diameters based on the total deviation defined in the selected rolling mill configuration (2712), as shown in the exemplary graph of FIG. 31. The maximum roll diameter range, i.e. new to discard, for the roll stands are then divided into a fixed number of increments (step 2714). This increment is preferably easily adjustable.

The system then operates to store the indices of the rolls that would fall within the limits for each stand into a families array (step 2716). In the case where multiple rolls fall within the limits for the same stand, only the one closest to the nominal roll diameter would be stored, providing both the lowest total and interstand deviations for that family. If no roll falls within the limits for a particular stand, then the closest highest roll outside the limits is stored into that family. The number of stands with selected rolls outside the calculated limits is then entered into the array, if all the rolls are within the limits, then this value is 0, as shown in the exemplary table of FIG. 32.

After a family has been created, the interstand roll deviations are calculated between each stand, along with the actual total deviation from the first stand to the last stand (step 2720). The total deviation will be calculated from the nominal roll diameter, as shown in the exemplary table of FIG. 33. When calculating the interstand deviation, the % compensation for each stand, if any, must be taken into account.

The last stand roll diameter would then be reduced by the predetermined increment, producing a new set of nominal roll diameters and limits for each stand. The system then repeats the above procedure, filing the next families array index with a new series of roll array indices (step 2720).

The last stand's roll diameter would be incrementally reduced until the discard roll diameter for any stand is reached, at which time the sorting routine would be complete (step 2722).

The system then identifies and eliminates any duplicate families from the families array, i.e. families containing the same roll indices for each stand (step 2724). The frequency of occurrence of duplicate families will be increased with the increase in the number of increments entered between new and discard rolls. It will be appreciated that the higher the number of increments, the finer the sorting routine will be creating a more efficient array of roll possibilities.

The system will identify duplicate families by simply adding the roll indices stored in the family array for each increment. Family array increments with the same indices total may be duplicate families. The system must then compare the indices on a stand basis in order to eliminate the possibility of families with transposed roll indices. If a duplicate family is found, then the family with the smallest total deviation is stored, all other duplicate families will be eliminated.

The families array is then sorted based on families with increasing rolls outside the limits and decreasing total deviation (step 2726). The system then displays the family with the smallest deviation to the operator (step 2728). The user can scroll through all the created families, in increasing total deviation and increasing rolls outside the limits. If a family contains a roll that fell outside the calculated limits, then a warning message will be displayed indicating that grinding is required for the identified stand.

The system will save the family at the command of the user. This new family will now be removed from the families array and stored in the families database, at which time the roll information for all the rolls in the family will be updated with their matching roll's ID and new family tag (step 2730). The user will then be prompted for a new roll location for which all the rolls will be stored. After the location has been entered, the system then verifies whether that location is currently occupied. If the location is vacant, the roll information database for each roll is updated with the new location. If, however, that location is occupied, then the user can sort through and select a new storage location from those available (step 2732).

Thereafter, a report is generated containing the stand number, roll ID, present roll location and new location for all the rolls in the newly created optimized roll family (step 2734).

If any of the families in the families array used one or more of the rolls stored in the newly created family, then those rolls will be deleted from the family array indices. The families array will then be resorted based on decreasing total deviation and increasing rolls outside the limits. The user at that point is free to create another family.

Attached hereto as Appendix A is a complete source code listing of a preferred software program embodiment of the present invention.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A system for optimizing an inventory of rolls used in a rolling mill, said rolling mill having a plurality of rolling equipment each utilizing a predetermined combination of roll stands and roll guides, each of said roll stands and roll guides utilizes at least one pair of rolls for respectively working and guiding an entry product of a predetermined size into an output product of a selected size, said system comprising:

means for compiling and storing data corresponding to individual rolls in said inventory;

means for defining predetermined operational parameters for said rolling mill to produce said output product;

means for iteratively correlating said data corresponding to said individual rolls with said operational parameters to create an array of possible roll combinations for each rolling equipment by sorting said inventory of rolls; and means for determining optimal family sets of rolls from said array of possible roll combinations for the rolling mill in accordance with said operational parameters.

2. The system of claim 1, wherein said data corresponding to each roll comprises the roll type which relates to the physical dimensions of each roll including roll diameter, initial and discard diameters, barrel width and number of possible grooves.

3. The system of claim 1, wherein said data comprises history of use information including age, tonnage rolled, physical location of roll, physical condition of roll, or manufacturer and identification indicia of roll.

4. The system of claim 1, wherein said data comprises groove information associated with each roll including the geometrical dimensions, name and groove type, and the type of mill the groove is associated with.

5. The system of claim 1, wherein said operational parameters comprises equipment layout specifications and roll configurations.

6. The system of claim 5, wherein said equipment layout specifications comprises the particular pieces of equipment used in the mill, the number of stands and guides in a particular piece of equipment, and the type of housing used by each particular piece of equipment.

7. The system of claim 5, wherein said roll configurations include information related to the roll grooves necessary for a given piece of equipment to roll said selected size of said output product and, maximum and measured interstand roll diameter deviation, hot equivalent entry size of product into the mill, hot equivalent delivery size from the mill, identification of first and last rolling stands, and percentage of roll diameter compensation.

8. The system of claim 1, wherein said correlating means is further operable for sorting through said inventory of rolls and categorizing each roll to be associated with a particular stand or guide based on groove pass geometry and dimensions for said particular stand or guide.

9. The system of claim 8, wherein said correlating means is further operable for creating said array of possible roll combinations for each roll stand or roll guide within a predefined roll diameter deviation which are indexed in accordance with decreasing mean roll diameter.

10. The system of claim 9, wherein said defining means is further operable for calculating nominal roll diameters for each stand or guide and identifying rolls having mean roll diameters within selected limits of said nominal roll diameters.

11. The system of claim 10, wherein said defining means is further operable for defining said family sets of rolls for the rolling mill in order of proximity to said nominal roll diameters.

12. The system of claim 11, wherein said defining means is further operable for calculating interstand roll deviations between each stand along with the actual deviation from the first stand to the last stand, said total deviation being calculated from the nominal roll diameter.

13. The system of claim 12, wherein said defining means is further operable for calculating said interstand roll deviations with a percentage roll diameter compensation for each stand by reducing the roll diameter of the last stand by a predetermined increment in accordance with said percentage compensation and generating a new set of nominal roll diameters and limits for each stand.

14. The system of claim 13, wherein said defining means is further operable for incrementally reducing the roll diameter of the last stand until a lower discard limit on the mean roll diameter for any stand is reached.

15. The system of claim 1, wherein said defining means is further operable for eliminating duplicate family sets of rolls.

16. The system of claim 1, wherein said rolling equipment comprises a no-twist mill.

17. The system of claim 1, wherein said rolling equipment comprises a sizing mill.

18. A method of optimizing an inventory of rolls used in a rolling mill, said rolling mill having a plurality of rolling equipment each utilizing a predetermined combination of roll stands and roll guides, each of said roll stands and roll guides utilizes at least one pair of rolls for respectively working and guiding an entry product of a predetermined size into a output product of a selected size, said method comprising the steps of:

compiling and storing data corresponding to individual rolls in said inventory;

defining predetermined operational parameters for said rolling mill to produce said output product;

iteratively correlating said data corresponding to said individual rolls with said operational parameters to create an array of possible roll combinations for each rolling equipment bv sorting said inventory of rolls; and determining optimal family sets of rolls from said array of possible roll combinations for the rolling mill in accordance with said operational parameters.

\* \* \* \* \*